Feb. 25, 1936.   B. M. SHIPLEY   2,031,860
CASH REGISTER
Filed Jan. 24, 1930   14 Sheets-Sheet 1

Inventor
Bernis M. Shipley
By
*Karl Benst*

His Attorney

Feb. 25, 1936.    B. M. SHIPLEY    2,031,860
CASH REGISTER
Filed Jan. 24, 1930    14 Sheets-Sheet 3

Inventor
Bernis M. Shipley
By
Carl Beust
His Attorney

Feb. 25, 1936.      B. M. SHIPLEY      2,031,860
CASH REGISTER
Filed Jan. 24, 1930      14 Sheets-Sheet 4

Inventor
Bernis M. Shipley
By
Carl Beust
His Attorney

Feb. 25, 1936. B. M. SHIPLEY 2,031,860
CASH REGISTER
Filed Jan. 24, 1930 14 Sheets-Sheet 5
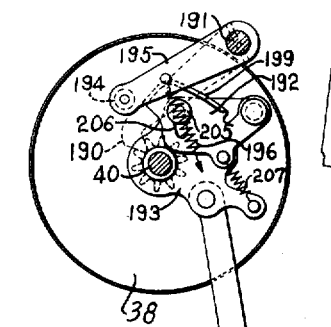
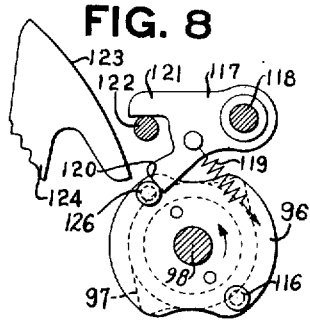
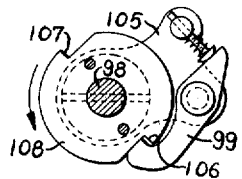
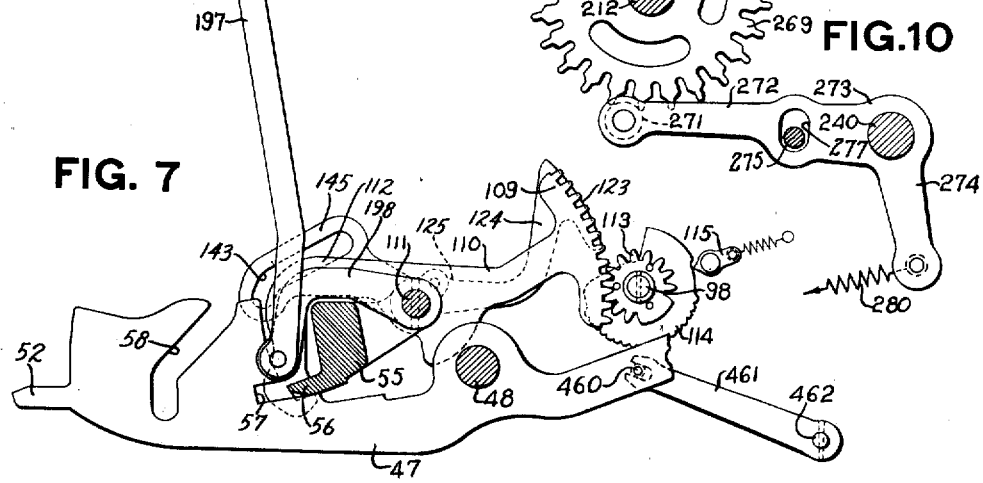
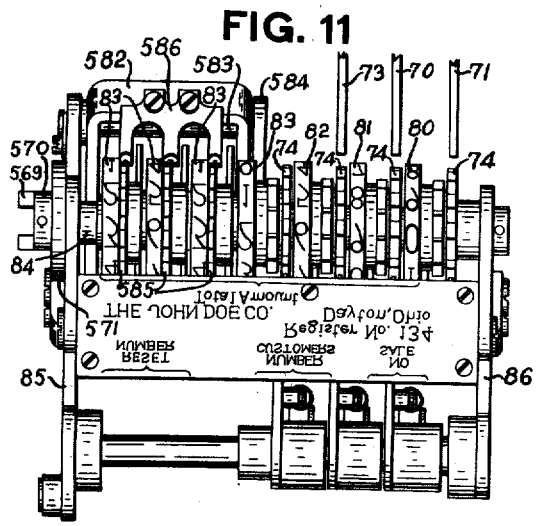
Inventor
Bernis M. Shipley
By
His Attorney Feb. 25, 1936.    B. M. SHIPLEY    2,031,860
CASH REGISTER
Filed Jan. 24, 1930    14 Sheets-Sheet 6
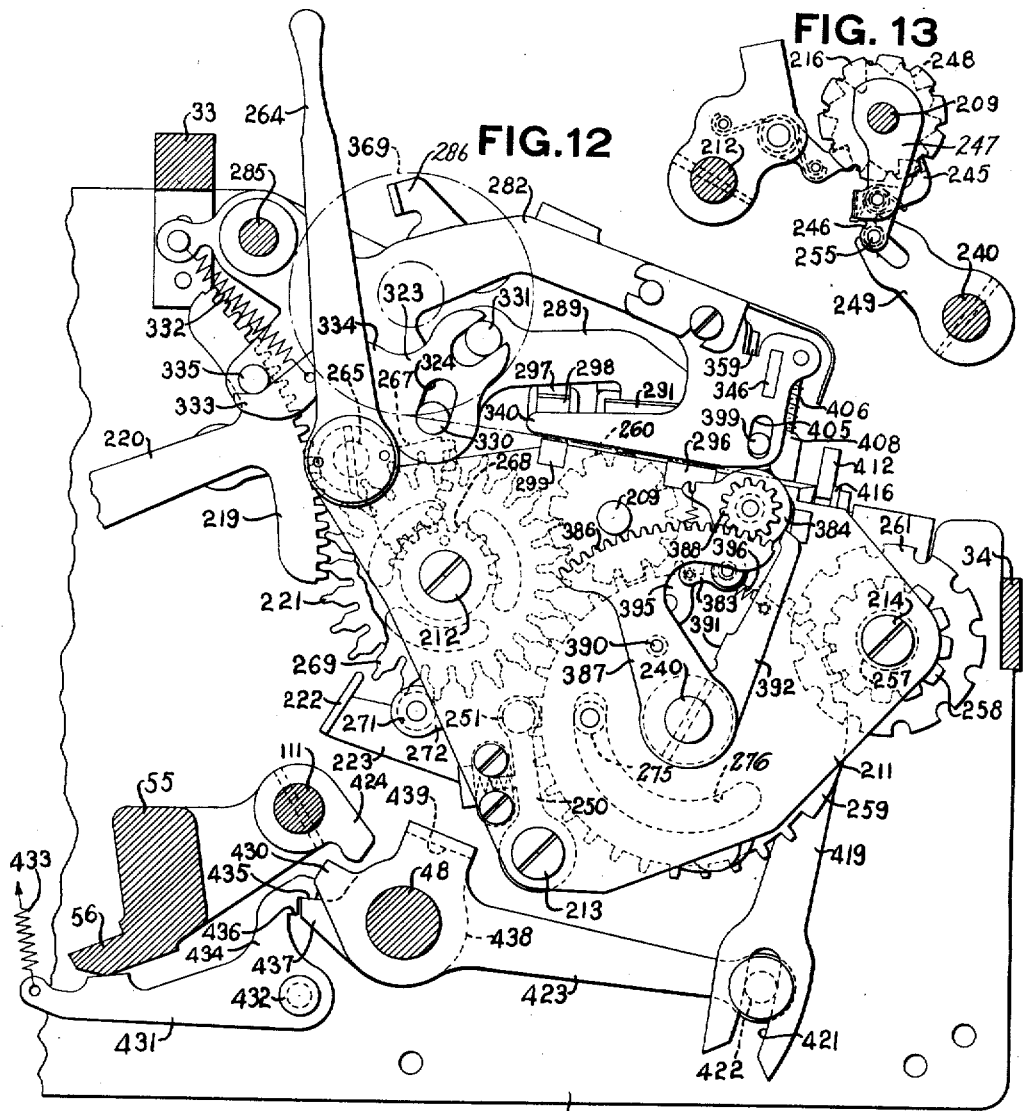
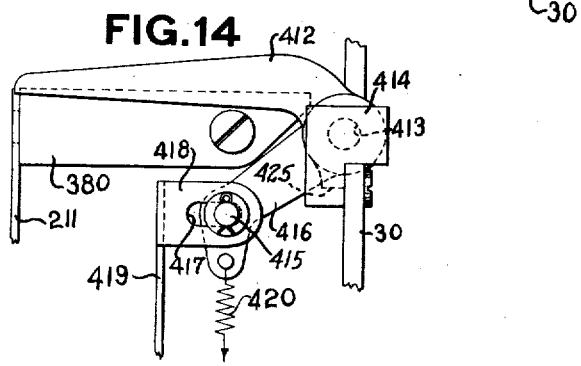
Inventor
Bernis M. Shipley
By
Earl Benst
His Attorney Feb. 25, 1936.    B. M. SHIPLEY    2,031,860
CASH REGISTER
Filed Jan. 24, 1930    14 Sheets-Sheet 7

Inventor
Bernis M. Shipley
By
Kearl Benst
His Attorney

Feb. 25, 1936.    B. M. SHIPLEY    2,031,860
CASH REGISTER
Filed Jan. 24, 1930    14 Sheets-Sheet 8

Inventor
Bernis M. Shipley
By
Earl Benst
His Attorney

Feb. 25, 1936. B. M. SHIPLEY 2,031,860
CASH REGISTER
Filed Jan. 24, 1930 14 Sheets-Sheet 9
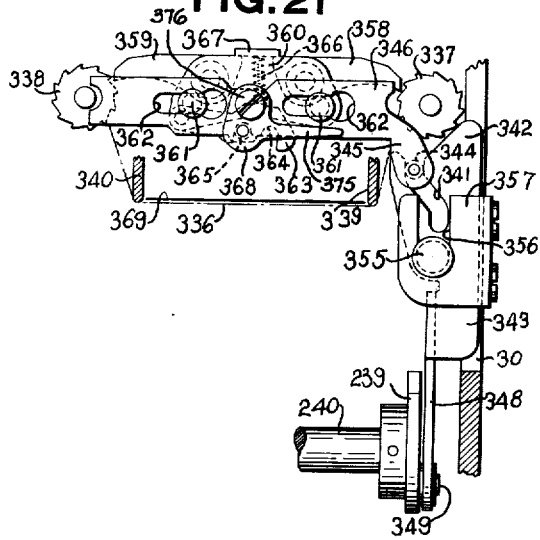
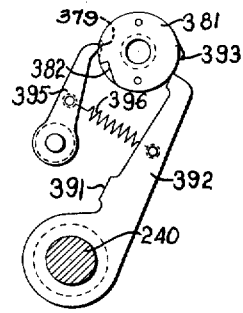
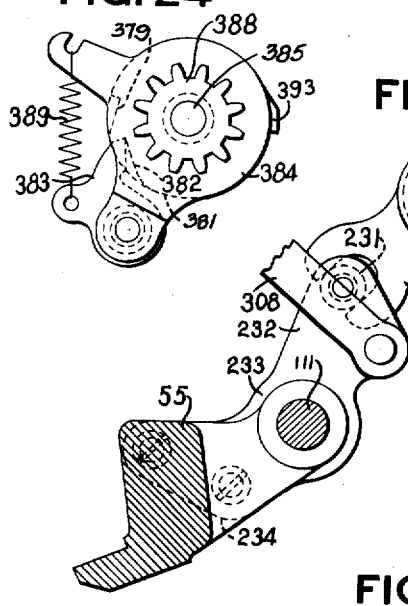
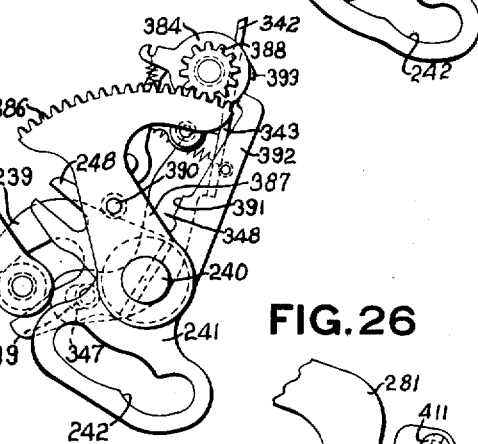
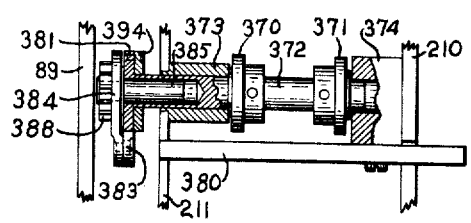
Inventor
Bernis M. Shipley
By
Carl Beust
His Attorney Feb. 25, 1936.  B. M. SHIPLEY  2,031,860
CASH REGISTER
Filed Jan. 24, 1930  14 Sheets-Sheet 10

Inventor
Bernis M. Shipley
By Earl Benst
His Attorney

Feb. 25, 1936.  B. M. SHIPLEY  2,031,860
CASH REGISTER
Filed Jan. 24, 1930   14 Sheets-Sheet 11

Inventor
Bernis M. Shipley
By
Carl Benst
His Attorney

Feb. 25, 1936.  B. M. SHIPLEY  2,031,860
CASH REGISTER
Filed Jan. 24, 1930  14 Sheets-Sheet 12
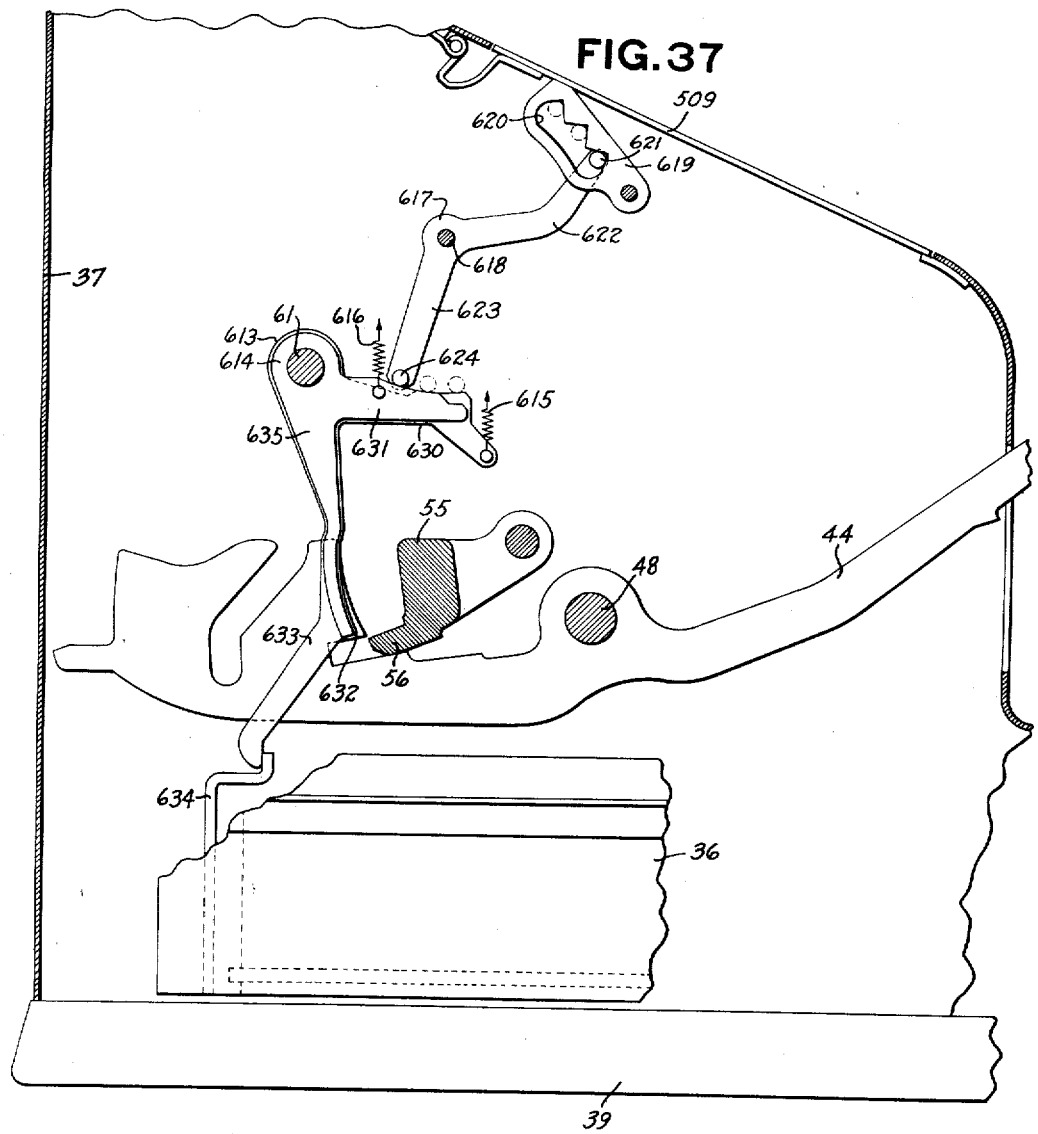
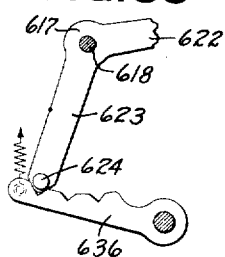
Inventor
Bernis M. Shipley
By Kearl Benst
His Attorney Feb. 25, 1936.   B. M. SHIPLEY   2,031,860
CASH REGISTER
Filed Jan. 24, 1930   14 Sheets-Sheet 13
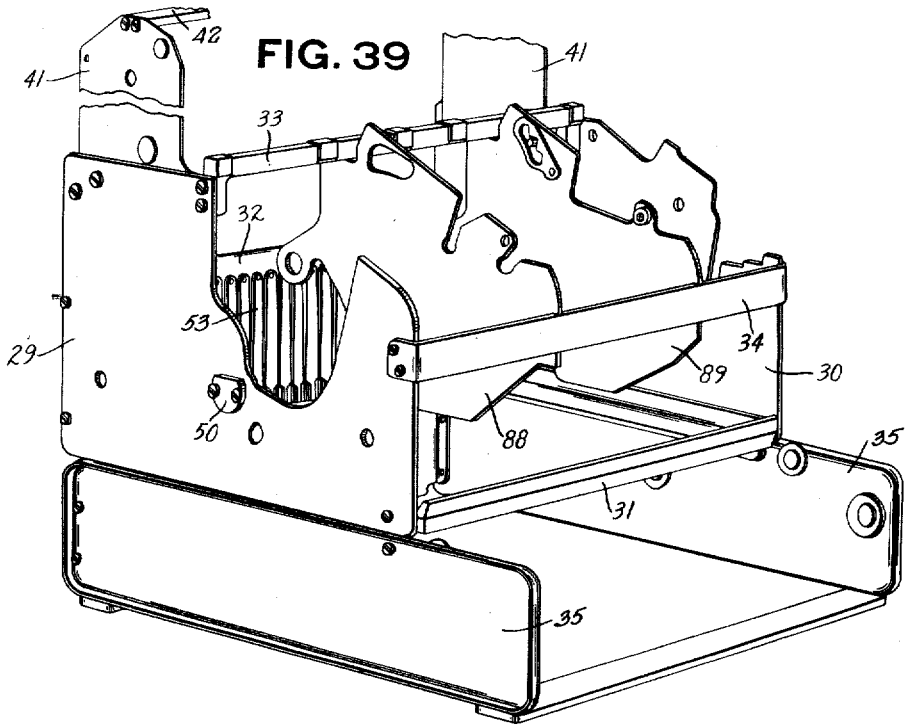
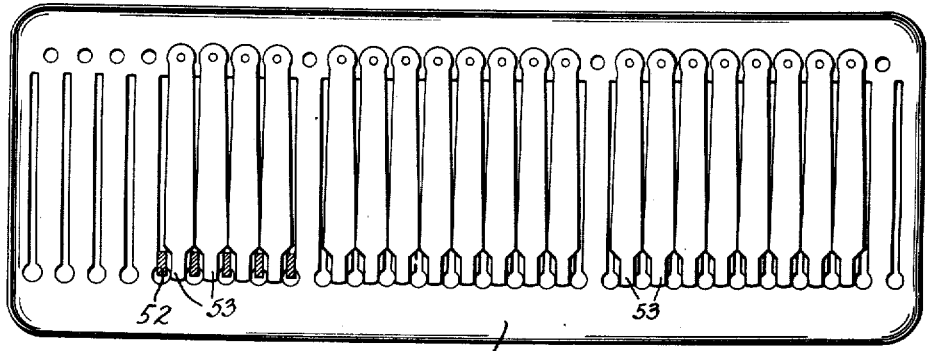
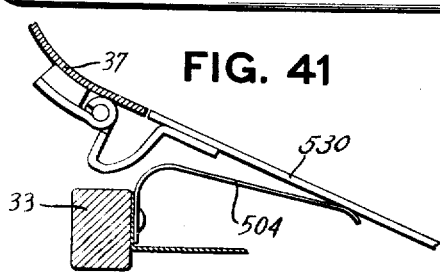
Inventor
Bernis M. Shipley
By
His Attorney Feb. 25, 1936.  B. M. SHIPLEY  2,031,860
CASH REGISTER
Filed Jan. 24, 1930   14 Sheets-Sheet 14

FIG. 42

Inventor
Bernis M. Shipley
By
Carl Beust
His Attorney

Patented Feb. 25, 1936

2,031,860

UNITED STATES PATENT OFFICE 2,031,860

CASH REGISTER

Bernis M. Shipley, Dayton, Ohio, assignor to The National Cash Register Company, Dayton, Ohio, a corporation of Maryland Application January 24, 1930, Serial No. 423,230

31 Claims. (Cl. 235—3)

This invention relates to cash registers and like machines, and more particularly refers to improvements in machines of the press-down key type.

The machine of the present invention is an improved and simplified machine of the type disclosed in United States Letters Patent No. 1,804,650, issued to Bernis M. Shipley on May 12, 1931, and in application for Letters Patent of the United States, Serial No. 334,482, filed January 23, 1929, by Bernis M. Shipley.

The machine of the present application is characterized by its simple and inexpensive construction and ability to perform certain of the functions usually found only in more expensive cash registers.

Heretofore, difficulty has been experienced in adapting the roller type indicator to machines of the press-down key type, due to whipping of the indicator which must be set at the downward stroke of the keys. This stroke is quite rapid and, when, for instance, the "9" key, or any of the higher order keys, are depressed with the suddenness peculiar to this type of machine, the indicators, rotating rapidly from zero position and stopping suddenly in the "9" position or other higher order positions, throw a great strain on the indicators and on the indicator setting mechanism.

It is an object of the present invention to provide an inexpensive and simplified form of press-down key type cash register, embodying receipt printing and total printing elements usually found only in more expensive machines.

Another object is to adapt the roller type of indication to a press-down key type machine.

Still another object of the present invention is to provide novel and improved indicator aligning mechanism.

With these and incidental objects in view the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 7 is a detail view of the indicator aliner operating mechanism and means for rotating the drive shaft.

Fig. 8 is a detail view of the means to prevent overthrow of the totalizer engaging cam.

Fig. 9 is a detail view of a part of the drive shaft operating mechanism.

Fig. 10 is a detail view of the clerk type wheels setting gear aligning mechanism.

Fig. 11 is a top plan view of the totalizer.

Fig. 12 is a view in left elevation of the receipt printer.

Fig. 13 is a detail view of the consecutive counter associated with the check printer.

Fig. 14 is a detail view in front elevation of the check severing device.

Fig. 21 is a detail view in front elevation of the ribbon feeding and reversing mechanism.

Fig. 22 is a detail view of the check feed retaining pawls.

Fig. 23 is an enlarged detail view of the amount type wheel aliner and its operating mechanism.

Fig. 24 is an enlarged detail view of a part of the mechanism illustrated in Fig. 25.

Fig. 25 is a detail view of the check feed operating mechanism.

Fig. 26 is a fragmentary view of the paper tension device.

Fig. 27 is a detail view partly in section showing the details of construction of the check feed drive mechanism.

Fig. 37 is a view in elevation showing the mechanism for selectively locking the machine.

Fig. 38 is a fragmentary detail view of the spring pressed aliner and locating pawl for the machine lock control setting lever.

Fig. 39 is a perspective of the main frame work of the machine.

Fig. 40 is a view in front elevation of the back frame of the machine showing the arrangement of the key stops or locks.

Fig. 41 is a fragmentary detail view showing the spring for partially opening one of the lids or covers.

Fig. 42 is a perspective somewhat similar to Fig. 5, and showing the connections between the differential frames and the totalizer.

*General description*

The main elements usually provided in cash registers of the type to which this application is drawn are included in the present machine. These elements include depressible keys, a totalizer, totalizer actuators and totalizer engaging and disengaging means, all driven by an operation of the keys. In addition, printing and feeding mechanism are provided to print and issue a receipt having printed thereon a clerk's identification symbol, the date, consecutive number and the amount of the transaction entered.

Manually operated means is provided to print on a record strip, the total amount standing on the totalizer, a section of which strip may be drawn out and detached by the operator. The slip so detached contains a record of the total when the totalizer is reset to zero, or of a subtotal of periodic business. It also has printed thereon from another type line, the serial number of the resetting operation, the number of customers served, the number of no-sale operations and the date of the transaction.

Depression of an amount key, as is the case in most machines of the press-down key type, engages the totalizer with the actuator, operates the actuators to add amounts on the totalizer, and disengages the totalizer from the actuator. The keys, when depressed, also set indicators and type wheels and release the normally inaccessible cash drawer for operation.

*Detailed description*

Figure 1:
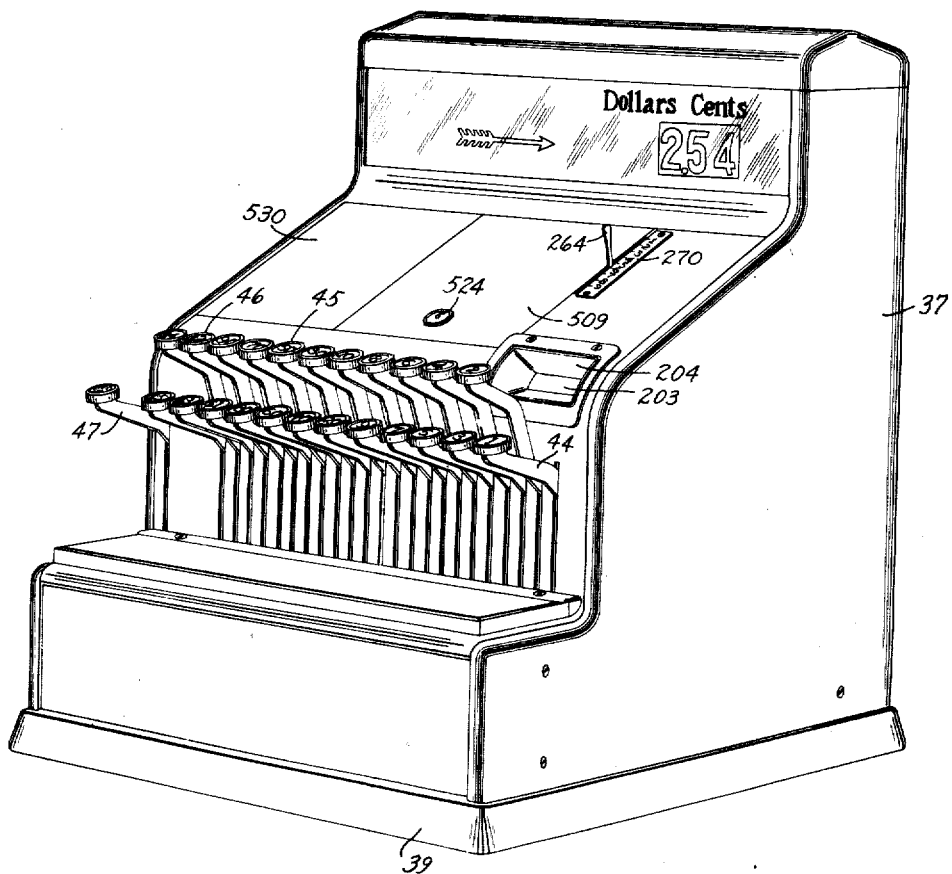
Fig. 1 is a perspective view of the machine incased in its cabinet.

The main body of the machine is supported between two main side frames, a left side frame 29, and a right side frame 30 (Figs. 2, 3, 12, 18, 37 and 39), secured to opposite sides of a sub-base 31. The side frames 29 and 30 are connected at the rear by a wide channel bar 32, at their top by a cross bar 33, and at the front by a cross bar 34. The base 31, in turn, is fastened to and supported on a framework 35 extending forwardly from the base and forming, in conjunction therewith, a closure suitable for accommodating a cash drawer 36, a fragment of which is shown in Fig. 37. A cabinet or casing 37 encloses the mechanism of the machine, the top of the cabinet being so shaped to form a suitable closure for indicators 38 (Fig. 3), supported on an indicator shaft 40 journaled in indicator frames 41 (Figs. 3 and 39), secured to the top of the side frames 29 and 30 and being joined at their tops by a cross bar 42. Suitable sight openings 43 (Fig. 3), in the cabinet 37, at the front and rear of the indicators shown, enable the indicators to be seen. The framework and the cabinet 37 rest on a base 39 (Figs. 1, 3 and 37).

*Keyboard*

The keyboard selected for illustrative purposes includes three denominational groups of "press-down" type amount keys, a group of amount keys 44, (Figs. 1, 2, 3, and 37) to register the units of cents, a group of amount keys 45 to register the tens of cents, and a group of keys 46 to register the units of dollars. A "no-sale" key 47 is located at the extreme left of the keyboard (Figs. 1 and 2) to operate the machine when no amount is to be registered in the totalizer, but merely to gain access to the cash drawer.

All of the key levers are pivoted on a supporting rod 48 (Fig. 3) extending between, and supported in, the side frames 29 and 30. The forward ends of the keys project through vertical guide slots 49 in the cabinet 37 and carry the usual designating key tops.

A key coupler 55 (Figs. 2, 3, 7, 12, 15, 25 and 37) cooperates with all of the key levers 44, 45, 46 and 47, to restore them to normal position after they have been fully depressed, and to actuate certain elements of the machine, as will be described later. The key coupler 55 extends across the machine in the rear of the support rod 48, just above the rear arms of the key levers, and rocks on pintles 50 and 51 (Fig. 2) projecting inwardly from the side frames 29 and 30 respectively. The lower edge of the key coupler 55 extends rearwardly to form a coupling bar 56 resting on the rear arms of the key levers and in line with recesses 57 formed in the enlarged rear arms of the key levers. When a key, or a key in each of the groups, is depressed, it rocks the key coupler upwardly, and, due to the key coupler and the key levers being pivoted on different centers, the coupling bar 56 enters the recesses 57 in the depressed keys, to couple these keys together. At the same time the coupling bar 56 passes upwardly in front of arcuate edges 54 on the forward part of the enlarged rear arms of the undepressed keys, thereby locking such keys against depression after the depressed key has been advanced a certain distance.

An interlock, comprising a plurality of key stops 53 (Figs. 3, 39 and 40) pivotally supported on the back frame 32 prevents depression of more than one key in each group at one time, or at the same operation of the machine. The key stops 53 are pivotally supported on the forward side of the back frame 32, each stop 53 being swung between two of a series of guide slots through which extend projections 52 on the keys. Depression of a key raises its rear end and spreads apart the stops for the particular bank of keys in which a key is depressed. This positions angular shoulders on the stops above the projections 52 for the remainder of the keys in the bank to prevent depression thereof.

When the operator releases the depressed key after it has been fully depressed, the weight of the key coupler 55 rocks the key or keys to normal position.

Differential mechanism

A differentially movable element, similar to the differential mechanism disclosed in the above named patent of Bernis M. Shipley, No. 1,804,650, is associated with each denominational group of amount keys 44, 45 and 46.

A differential cam slot 58 is formed in the enlarged rear of each of the key levers, of each group of keys, to give the differential elements different extents of movement according to a particular key depressed in each group. In the tens of cents group (Fig. 3) depression of the key 45 engages its cam slot 58 with a universal rod 59 extending above the mouths of the cam slots 58 in the keys 45 and being carried between two segments 60 (Figs. 5 and 42), pivoted on a rod 61, extending between the side frames 29 and 30 of the machine, to rock the bail formed by the segments 60 and the rod 59, a distance corresponding to the value of the key depressed. The rod 59 is rotatably mounted on spindles (not shown) projecting inwardly from the lower end of the segments 60.

Figure 5:
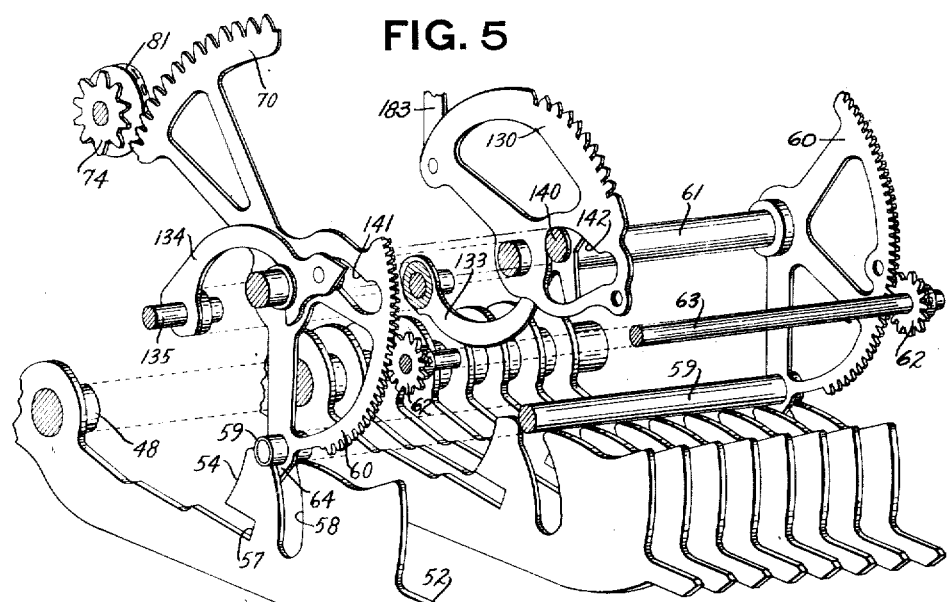
Fig. 5 is a perspective of one of the differential frames.

The rod 59 does not connect the segments 60 rigidly together, wherefore it is necessary to provide other means to insure uniform movement of these segments. When a depressed key cooperates with the universal rod 59 near one of its ends and its slot engages the rod 59 to advance the differential bail correspondingly, the segment 60 farthest from the depressed key has a tendency to lag, thereby causing torsional strain on the segment and on the rod 59. This strain is eliminated by a pair of pinions 62 (Figs. 5 and 42) fast on a shaft 63 journaled in a pair of brackets 75 and 76 secured to the machine side frames 29 and 30 respectively, the shaft 63 being parallel with the rod 61 on which the segments 60 are journaled. For the sake of clearness, the shaft 63 and pinions 62 are shown in Fig. 5 below their correct positions; Figs. 3 and 42, however, show them correctly. The pinions 62 mesh with the segments 60. The rotary motion of one of the segments 60 is communicated by the pinions 62 and the shaft 63 to the other segment 60 to rotate this segment a distance exactly equal in extent of movement to the movement of its companion segment.

During its return movement the depressed key restores the differential bail to its normal position where its movement is arrested by a toe 64 on the segment 60 striking a stud 65 (Fig. 3) projecting laterally from the rear arm of the 10-cent key 45. The stud 65 stops the bail with the rod 59 in alignment with the mouths of the differential slots 58 in the rear arms of the key levers 45.

A zero stop arm (not shown) is provided in connection with each group of keys to prevent movement of the differential bail out of zero position when no key is depressed in that particular group. This zero stop arm is identical with the one disclosed in Shipley's application, Serial No. 334,482 and since it has no particular bearing on the present invention, detailed description thereof is omitted from this specification.

Referring to Fig. 42, a differential actuating mechanism comprising a pair of segments 79 and 100 and a universal rod 104 are provided to cooperate with the units-of-cents keys 44, and a pair of segments 77 and 78 and a universal rod 126 are provided to cooperate with the units-of-dollars keys 46. A pair of pinions 66 fast on a shaft 67 mesh with the segments 79 and 100 to synchronize their movement. Likewise, the segments 77 and 78 are joined by a pair of pinions 127 on a shaft 68.

Additional pinions 103, one fast on each shaft 63 and 68, mesh with segments 101 and 102 respectively, journaled on the rod 61. These segments, along with segment 100, set the type carriers corresponding to the particular key depressed in each of the groups of keys.

The movements of the differential elements are transmitted to the totalizers to accumulate thereon the amount corresponding in value to the particular keys 44, 45 and 46 depressed.

This is accomplished for the group of tens-of-cents keys 45 by extending one of the segments 60 upwardly and toward the front of the machine to form a totalizer actuator segment 70. Likewise, the segment 79 of the units-of-cents differential bail 104 is extended to form a totalizer actuator segment 71. In the case of the units-of-dollars bail 126, both differential segments are located out of line with the totalizer. To transmit the differential movement of the bail 126 to add on to the dollars totalizer wheel, a pinion 72 fast on the shaft 68 meshes with a segment 128 pivoted on the rod 61 and is extended to form a totalizer actuator segment 73. Obviously the movement of the various differential bails, through the mechanism described, sets the totalizer actuators differentially according to the value of the keys depressed in the several groups.

Totalizer

The totalizer illustrated in connection with the present invention is of the general type as disclosed in the patent to Thomas Carney, No. 532,762, issued January 22, 1895, and it is thought that a brief description of the totalizer will be sufficient.

The totalizer is not visible to the operator, and in order to ascertain the amount standing thereon it is necessary to take an impression, in a manner to be later described, on the record material from the totalizer wheels, which in the present instance are printing wheels.

The totalizer includes a units of cents wheel 80 (Fig. 11), a tens of cents wheel 81, a units of dollars wheel 82 and a plurality of overflow wheels 83. The totalizer wheels 80, 81 and 82 are actuated by the units and tens of cents and the units of dollars actuators 71, 70 and 73, respectively, which mesh with gears 74, one fast on each of the wheels 80, 81 and 82, and the lower order wheel 83. The wheels 83 are used to accumulate the overflow from the units of dollar wheels 82. The usual transfer or carrying over mechanism is provided for the wheels 80, 81 and 82 and the lowest order wheel 83 and the conventional Geneva transfer, such as is disclosed in the above-mentioned Carney patent, is provided for the higher order overflow wheels 83.

The totalizer wheels are all rotatably mounted on a shaft 84 journaled in totalizer side frames 85 and 86, which in turn are rockably mounted on pintles, only one of which 87 is shown herein, extending inwardly from a pair of intermediate frames 88 (Figs. 33 and 39) and 89 (Figs. 3 and 39), suitably supported in the machine on the cross bars 33, 34, and on the rod 61. The totalizer side frames 85 and 86 are joined at their tops by an electro support bar 90 and at their forward edges by a bar 91 having its ends bent, and secured to the frames 85 and 86. The bar 91 supports a part of the transfer mechanism (not shown) with which the totalizer is provided and also forms a convenient support for a locking device to be described later. The lower end of the totalizer frame 85 forms a bell crank comprising two arms 92 and 93 extending forwardly therefrom and carrying rollers 94 and 95 respectively, cooperating with a pair of cams 96 and 97 (see also Fig. 8), rotatably mounted on a shaft 98 journaled in the intermediate frames 88 and 89. The cams 96 and 97 receive one-half of one rotation in a counter-clockwise direction as viewed in Figs. 3 and 8, by mechanism, to be described later, to rock the totalizer frames 85 and 86 first counter-clockwise to carry the totalizer wheels into mesh with the totalizer actuators and then, after the amount has been added on the totalizer, rocks the totalizer out of mesh with the acuators before said actuators return to their normal positions.

The totalizer is rocked into engagement with the actuators at the very beginning of the down stroke of the keys, there being a brief time before the cam slot 58 in the rear arm of the depressed key engages the rod 59 for this purpose, and is disengaged from the actuator at the end of the downward stroke of the key. A dwell near the bottom of the cam slot 58 allows for the disengaging of the totalizer as the key approaches the limit of its downward stroke.

After the totalizer is disengaged from the actuators, the operator releases the depressed key whereupon the key coupler 55 restores the keys to their normal undepresed position, which through the cam slots 58 and rods 59, 104 and 126, restores the segments 60, 77, 78, 79, and 100 and the totalizer actuators 70, 71 and 73 to their normal positions.

The mechanism for rotating the totalizer engaging cams 96 and 97 will now be described.

A spring-pressed pawl 99 (Fig. 9), pivotally supported on a drive arm 105 fast on the rock shaft 98, cooperates with one of a pair of opposed recesses 106 and 107 in the periphery of a disk 108 secured to the cams 96 and 97. The shaft 98 and the drive arm 105 are given one invariable rocking movement, first in a counter-clockwise direction and then in a clockwise direction, as viewed in Figs. 7 and 9, at each operation of the machine, by a tooth drive segment 109 carried on the forward end of an arm 110 fast on a shaft 111 secured to the key coupler 55 in axial alignment with the pintles supporting the key coupler.

To prevent torsional strain on the shaft 111, a tail 112 on the arm 110 extends rearwardly and downwardly where it is slotted to embrace the coupling bar 56 of the key coupler 55. The segment 109 meshes with a partial gear 113 (Figs. 7 and 33) fast on the rock shaft 98 and having fast to the side thereof a mutilated disk 114. A spring-centered pawl 115, pivoted on a stud projecting from the intermediate frame 88 cooperates with a serrated section of the periphery of the disk 114 to form the usual full-stroke device.

Depression of a key, or keys, rocks the key coupler 55 (Fig. 7), the tail 112, the shaft 111 and the segment 109 clockwise to rotate the partial gear 113 and the shaft 98 counter-clockwise through slightly more than 180 degrees of movement. The shaft 98 carries the drive arm 105 (Fig. 9) and coupling pawl 99 therewith, picking up the recessed disk 108 and rotating it and the cams 96 and 97 counter-clockwise exactly 180 degrees of travel, to first engage and then disengage the totalizer with the actuators, as described above.

Means is provided to prevent over rotation of the cams 96 and 97 at the sudden stoppage of the key coupler 55, segment 109 and drive arm 105, at the end of the downward stroke of a key. This means includes a device operated by the key coupler to stop the cams at exactly one-half rotation. The shaft 98 completes its counter-clockwise rotation at the instant the depressed key reaches the limit of its downward travel.

As the cams 96 and 97 rotate, a stud 116, projecting laterally from the face of the cam 96 strikes the lower edge of a restraining pawl 117, pivoted on a stud 118 projecting inwardly from the intermediate frame 88, displacing the pawl upwardly against the tension of its spring 119, which, as soon as the stud 116 is past the nose 120 of the pawl, restores the pawl to its normal position wherein the nose 120 rests in the path of the stud 116 to prevent retrograde movement of the cams 96 and 97 and of the disk 108. The downward movement of the pawl 117 is limiting by a finger 121 on the pawl striking a stud 122 projecting horizontally from the intermediate frame 88.

As the stud 116, near the end of the down stroke of the key, passes the nose 120 of the pawl 117, it strikes an arcuate face 123 of an arm 124 of a lever 125 (Figs. 3 and 7) fast on the key coupler shaft 111, the face 123 being moved downwardly into the path of the stud 116, as the key coupler 55 is rocked upwardly by depression of a key. A stud 126 located diametrically opposite the stud 116 moves from beneath the lower tip of the elongated face 123 before this face arrives in the path of the stud 116. The stud 126 is exactly like the stud 116 and is necessary because the cams 96 and 97 are symmetrical and do the work in one-half rotation normally done by a cam in a complete rotation.

When the operator releases the key at the end of the downward stroke thereof and the weight of the key coupler 55 restores the keys to normal, the segment 109 rotates the partial gear 113, the shaft 98 and the drive arm 105 clockwise, the pawl 99 (Fig. 9) travels over the periphery of the disk 108 until the nose of the pawl drops into the recess 106. On the restoring movement of these parts the cams 96 and 97 are held against restoring or clockwise movement by the pawl 117.

Thus, it can be seen that the oscillating movement of the rock shaft 98, by the drive arm 105 and pawl 99 turns the cams 96 and 97 one-half rotation at each operation of the machine, which, due to the configuration of the cams rocks the totalizer frames 85 and 86 first to engage, and then to disengage the totalizer with the actuators 70, 71 and 73.

*Indicators*

The machine is provided with indicators to display the amounts registered in the machine toward the front and also toward the rear of the machine.

Indicators of the "roller" type are substituted in the present machine for the "target" indicators usually provided in machines of this type. The advantages of the roller indicators as over the target indicators are that they can be manufactured at considerably less expense and they permit the indicators to appear in the proper relation.

There are two indicators for each denominational group of keys, the two being operated in unison, one to display the value of the depressed key toward the front and one to display the corresponding set-up toward the rear of the machine. The indicators are of the type disclosed in Letters Patent of the United States, No. 1,812,020, issued to William H. Robertson on June 30, 1931. These indicators are resiliently set in both directions to eliminate the torsional strain or shock occasioned by the rapid rotation of the indicators, especially when a "9" key is depressed with the indicator for that group of keys standing at "zero" or "one", and vice versa, when the "one" key is depressed and its indicator is standing at "8" or "9". The resilient indicator drive is not shown in the drawings of this case, but for a full understanding thereof, reference may be had to the above-mentioned Robertson patent.

A description of the setting of the indicators for the tens of cents bank will serve as illustrative for those of the other banks. The indicators are set by a minimum movement device, including a segment 130 (Figs. 3 and 5) pivoted on the rod 61, and an actuator therefor. The segment 130 has aligning teeth formed on the periphery thereof with which an aligner finger 131, yoked together with other fingers (see Fig. 2) and fast on a shaft 132 supported in the machine side frames 29 and 30, cooperates to align the segment 130 in the position to which it is moved. The segment 130 is set under the control of differential segments 60 by depression of a key 45.

A pair of companion links 133 and 134 (Fig. 3) curved outwardly to form a clearance opening therebetween for the rod 61, are pivoted at their lower ends on a bail 135 carried by and connecting a pair of swinging arms 136 and 137 pivoted on studs 138 and 139 projecting inwardly from the intermediate frames 86 and 89 respectively.

The lower ends of the companion links 133 and 134 are hubbed together and their upper ends, normally hooked over the rod 61, are connected by a stud 140. The two companion links are laterally spaced apart to embrace there-between a denominational group of parts comprising a differential segment 60 and an indicator setting segment 130.

The connecting stud 140 on the companion links 133 and 134 passes through a cam slot 141 formed in the differential segment 60, and also through a heart-shaped opening 142 formed in the indicator setting segment 130.

Inclined cam slots 143 and 144 formed respectively in actuator arms 145 (Fig. 3) and 146 (Fig. 4), fast on the shaft 111 and properly spaced apart thereon, embrace studs 147 and 148 projecting laterally from the lower ends of the swinging arms 136 and 137 respectively.

Depression of a key or keys, rocks the key coupler 55 and shaft 111 clockwise, carrying the actuator arms 145 and 146 therewith, thereby camming the bail comprising the rod 135, arm 136 and arm 137 clockwise about its pivots 138 and 139 to shove the companion links 133 and 134 rearwardly. At this movement the stud 140 travels in the cam slot 141 and the opening 142, and at the same time the differential cam slot 58 of the particular key depressed sets the segment 60 accordingly. The angle of the cam slot 141 in the segment 60 is such that as the stud 140 moves rearwardly therein it shifts the setting segment 130 from the position it occupied at the beginning of the operation, to its new position as determined by the value of the particular key depressed; or if no key is depressed in that denominational group, the stud 140 traversing the slot 141 with the segment 60 for that bank standing at zero, restores the setting segment 130 to its zero position.

As the actuator arrives at the outermost limit of its travel, it thrusts a pointed nose 149 on the end of the link 133 into a particular one of a series of serrations, determined by the particular key depressed, on an arcuate bar 150 securely mounted on rods 151 and 152 extending between the brackets 75 and 75 to positively align the companion links 133 and 134, the differential segment 60 and the indicator setting segment 130 at the instant the actuator arrives at its outermost point of travel.

It is to be remembered that the groups of keys for the pennies and dollars banks are each provided with a similar arrangement for setting their indicators.

Setting segment aligner

One of the features of the instant invention is the adaption of the well known "roller" type indicator to a machine of the "press down" key type. This is made possible by employing a novel aligning mechanism to positively align the indicator setting mechanism the instant said setting mechanism arrives at its new position and before the momentum of the resiliently set indicators can displace the setting, and which positively holds the aligners in engagement with the setting mechanism to prevent the back lash or whip from displacing the set indicators.

Figure 3:
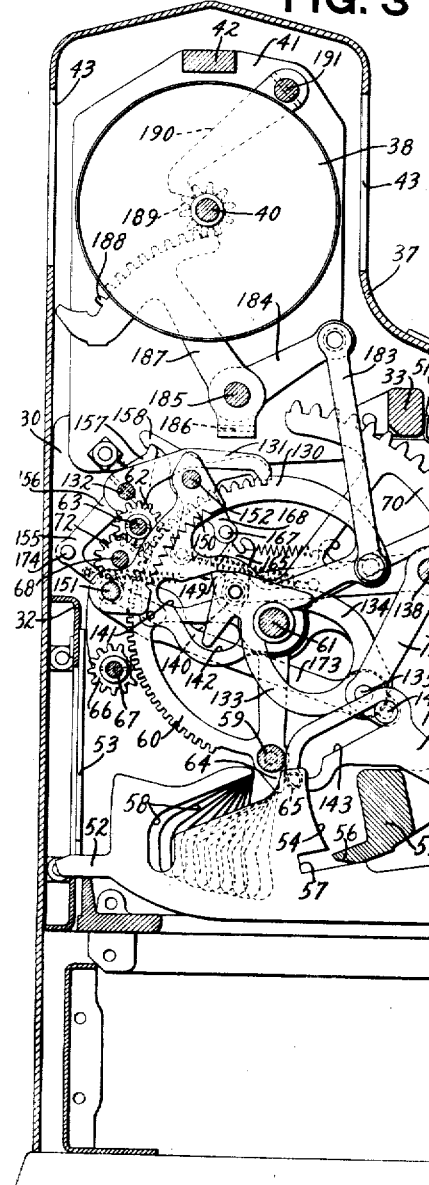
Fig. 3 is a transverse sectional view taken through the machine to the left of the 80¢ key, on line 3—3, Fig. 2.
Figure 4:
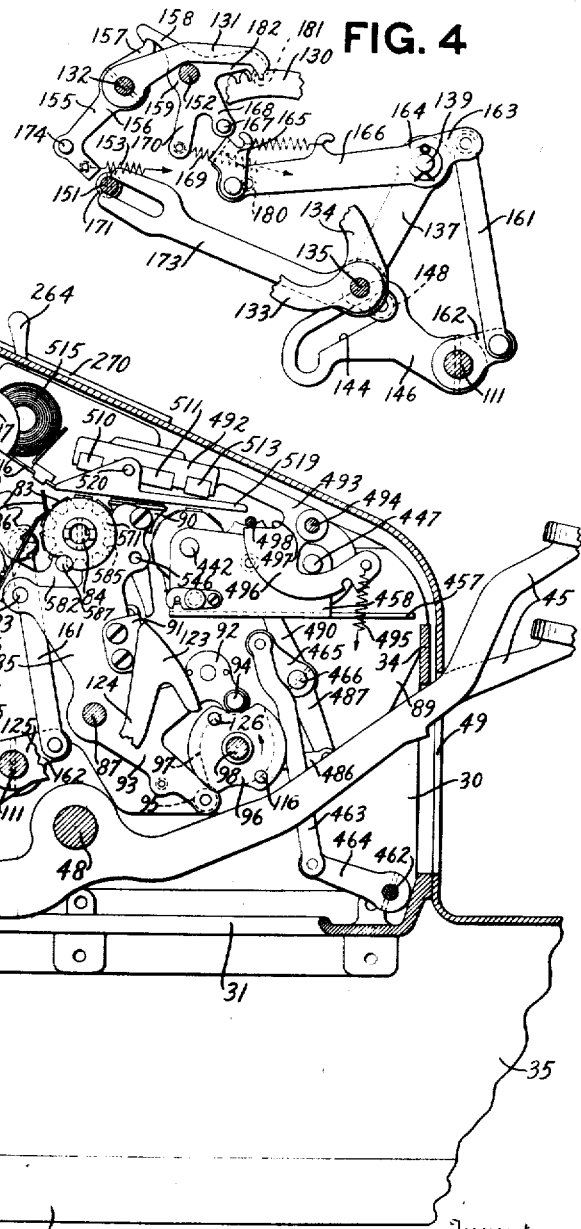
Fig. 4 is a detail view of the positively operated overthrow preventor.

This novel aligning mechanism is best shown in Figs. 3 and 4 and will now be described.

The setting segments 130 are normally locked by aligner fingers 131 engaging notches in the periphery of the segments 130. A spring 153 (Fig. 4) has one of its ends attached to an angular arm 155 of an aligner operating lever 156 fast on the shaft 132 on which the aligner fingers 131 are fast. The spring 153, urging the lever 156 and the shaft 132 to rock counter-clockwise, normally presses the tip of the other arm 157 of the lever 156 against a hook formed on a restraining arm 158 of a multiple-armed control lever 159 pivoted on the shaft 152 extending between the bracket 76 and a second bracket (not shown), which arm 158 normally restrains the lever 156 and shaft 132 in their normal positions, thereby positively holding the aligner fingers 131 in engagement with the aligning teeth on the setting segments 130.

Before the segments 130 can be moved to new positions it is necessary to disengage the aligners 131 therefrom. These aligners 131, when freed from the arm 158, are removed from the segment notches by the spring 153. To release the aligner fingers 131 to the action of their spring 153, to permit the stud 140 and differential segment 60 to reposition the setting segments 130, the aligner control lever 159 is rocked clockwise early in the operation of the machine by the following mechanism.

A link 161 (Figs. 3 and 4) connects an arm 162, fast on the key coupler shaft 111, to an arm 163 of a lever 164, pivoted on the stud 139 on which the swinging arm 137 pivots. This link 161 transmits the rocking movement of the key coupler 55 and the shaft 111 to the lever 164, rocking this lever first clockwise and then counter-clockwise to normal position.

On the clockwise rotation of the lever 164, a by-pass tappet 165, pivoted on the free end of the other arm 166 of the lever 164, strikes a stud 167 projecting laterally from an arm 168 on the control lever 159, rocking this lever also clockwise against the tension of a spring 169 having one of its ends attached to an arm 170 of the control lever 159, to remove the hooked arm 158 out of the path of the arm 157. The spring 153 then rocks the lever 156, shaft 132 and aligner fingers 131 counter-clockwise to free the aligner fingers from the setting segments 130. The counter-clockwise movement of these parts is limited by the squared end of the angular arm 155 striking a collar 171 surrounding, and being fast upon, the rod 151 extending between the brackets 75 and 76.

As soon as the tappet 165 is past the stud 167, its spring 169 rocks the multiple-armed lever 159 counter-clockwise, the movement being arrested by the nose of the arm 158 striking and resting on the tip of the arm 157, which was moved there-beneath at the disengaging movement of the aligner shaft 132.

The setting segments 130 are now free to be adjusted to the position as determined by the particular key depressed in each of the groups of keys. As the advancing key coupler and the cam slotted actuator arms 145 and 146, approach the end of their clockwise travel, the left-hand end of a pitman 173 pivoted on and actuated by bail 135, strikes a stud 174 on the arm 155, and rocks the lever 156 and shaft 132 clockwise to positively reenter the aligner fingers 134 in the serrations or notches in the setting segments 130. The pitman 173 is bifurcated at its left-hand end, as viewed in Figs. 3 and 4, to embrace and be guided by the rod 171. As the lever 156 rocks clockwise and the tip of the arm 157 clears the hook on the arm 158 the spring 169 restores the multiple-armed lever 159 to its effective position to positively restrain the aligner fingers 131 in their engaged position. At the very end of the depression of the key, or keys, and of the clockwise movement of the lever 164, a stud 180 on the arm 166 strikes a face 181 on an arm 182 of the lever 159 to positively move the hooked arm 158 into its restraining position with the tip of the arm 157, should the spring 169 for any reason fail to do so.

In actual operation of the machine, the tip of the pitman 173 restores the lever 156 just before the stud 180 strikes the face 181 of the arm 182, the spring 169 immediately rocking the lever 159 counter-clockwise to hook the arm 158 over the tip of the arm 157 so that the stud 180 normally does no work, merely acting as a safety member to prevent the lever 159 from lagging or sticking, and to insure that the segments 130 are positively aligned in their set position.

When the pressure on the depressed key or keys is released, and the key coupler 55 together with the shaft 111 rocks counter-clockwise to normal position, the actuator cams 143 and 144 rock the bail 135 counter-clockwise to withdraw the pitman 173 and, at the same time, the link 161 rocks the lever 164 counter-clockwise to normal, the by-pass tappet 165 wiping by the stud 167, tensioning its spring which, immediately after the tappet clears the stud, restores the tappet to its normal position. The counter-clockwise movement of the cam arms 145 and 146 through the cams 143 and 144 draws the bail 135 inwardly to restore the companion links 133 and 134 and the pitman 173 to their normal positions, as shown in Fig. 3.

The differential adjustment of the setting segments 130 rotates the indicators 38 to position them according to the particular keys depressed and, since the segments 130 are moved directly to their new positions, so also are the indicators 38 rotated from their old positions directly to their new positions without first passing through their zero positions.

A link 183 (Fig. 3) connects the setting segment 130 to an arm 184 pivoted on a shaft 185, journaled in the indicator frames 41, to transmit the differential movement of the segment 130 to the arm 184 connected by a yoke 186 to an arm 187 also journaled on the shaft 185. The arm 187 carries a segment 188, meshing with an indicator pinion 189 journaled on the indicator shaft 40 to rotate the indicator 38 from the position in which it was left at the end of the last operation, directly to its new position, as determined by the particular key depressed, without first returning the indicator to zero.

However, before the indicators may be reset to their new position it is necessary to disengage indicator aligners 190 (Figs. 3 and 7), fast on an aligner shaft 191 journaled in the indicator frames 41. An aligner 190 cooperates with the pinion 189 for each of the indicators. The aligners 190 serve to hold the indicators in parallel alignment after they have been set to their new position, thereby correcting any tendency of the indicators to assume a staggered alignment due to lost motion between the setting segment 130 and the pinions 189.

A flanged by-pass cam 192 (Fig. 7) pivotally carried on an operating arm 193, journaled on the indicator shaft 40, cooperates with a stud 194 on an arm 195 fast on the aligner shaft 191, to rock the arm 195, shaft 191 and the aligners 190 clockwise, disengaging the aligners from the pinions 189 and restraining them in the disengaged position until the indicators are set to their new positions, and then allows the stud 194 to escape the cam 192 whereupon an aligner restoring spring 196 reengages the aligners 190 with the pinions 189.

A link 197 connects the cam arm 193 to an aligner operating arm 198 fast on the operating shaft 111. When a key 44, 45, 46 or 47 is depressed and the key coupler 55 and shaft 111 rock clockwise, the arm 198 raises the link 197 to rock the cam arm 193 counter-clockwise engaging an angular flange 199 with the stud 194, rocking the arm 195 and shaft 191 clockwise to disengage the aligner 190. The short face of the flange 199 rocks the arm 195 and the longer face restrains the indicator aligners in their disengaged position for the proper duration of time, or until the indicators are set, whereupon the flange 199, continuing its counter-clockwise travel, passes from beneath the stud 194, freeing the arm 195 to the action of its spring 196, which immediately reengages the aligners 190 with the pinions 189.

At the return movement of the key coupler 55 and the shaft 111, the arm 198, by the link 197, rocks the cam arm 193 clockwise to its normal position, the inner face of the short flange riding over the stud 194. The movement (in both directions) of the cam 192 is limited by, and the cam is guided by, a stud 205 projecting from the arm 193 through a concentric slot 206 in the cam 192. A restoring spring 207 restores the cam to its normal position after the flange has passed the stud 194.

Issuing check printer

The machine is provided with a compact printing mechanism to issue a check upon which it prints a clerk's identification character, the date, consecutive or serial number and the amount of the transaction registered, from adjustable type carriers. The check web is automatically fed at each operation of the machine and the check severed therefrom near the end of the operation, the check being fed out through a suitable aperture 203 (Fig. 1) in a chute 204 secured to the cabinet 37.

An ink ribbon and a suitable feeding and reversing mechanism is provided to enable a printing hammer of novel structure to take impressions from the type.

The check paper supply roll, printing hammer, ribbon feed and reversing mechanism and a pair of check tension rollers are all carried on a hinged frame which is adapted to be swung upwardly to gain access to the ink ribbon and to permit replacement of the exhausted paper supply roll.

Type wheels

The adjustable type wheels are all rotatably mounted on a shaft 209 (Fig. 12), journaled in a printer bracket 210 (Fig. 6) suitably supported on the right side frame 30 of the machine, and in a printer bracket 211 (Figs. 6 and 12) suitably supported on studs 212, 213 and 214 projecting from the bracket 210.

Figure 6:
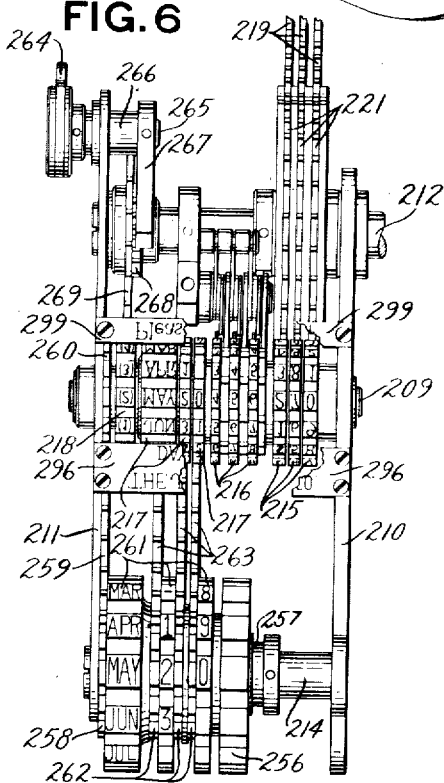
Fig. 6 is a top plan view of the check printing types and setting mechanism.
Figure 15:
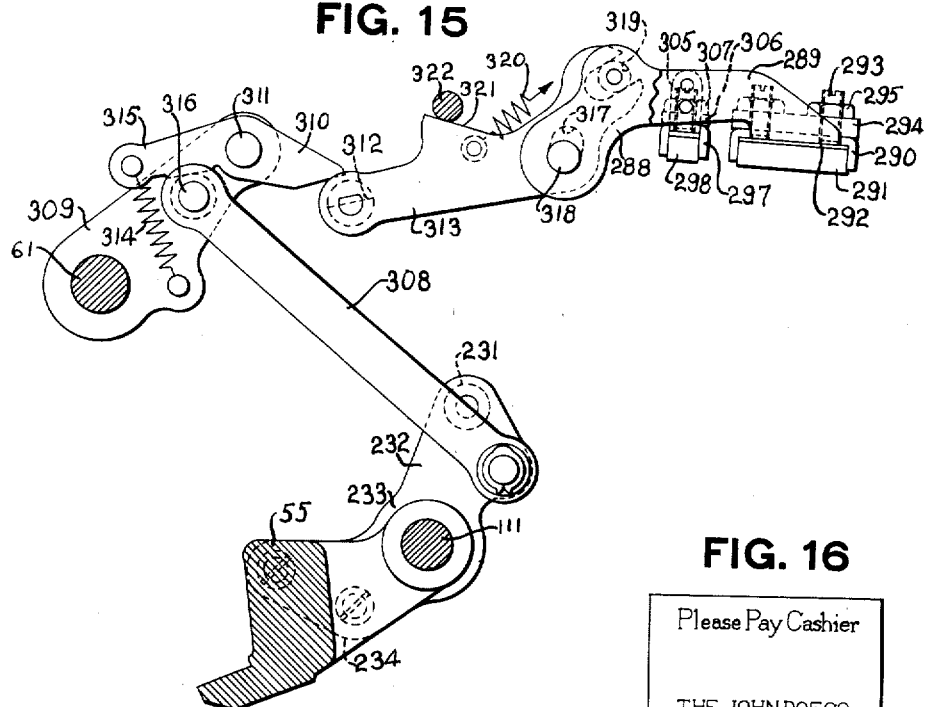
Fig. 15 is a detail view of the receipt or check printing hammer.

As viewed in Fig. 6, or from the front of the machine, the first group comprising the three type wheels 215 at the right is the group of amount wheels. Next to the left of the amount wheels is a group of three consecutive number wheels 216, and to the left of this group are the date wheels, comprising a group of three wheels 217, to print the name of the month and the date of the month. On the extreme left end of the type line is located a single type wheel 218, to print the clerk's identifying symbol.

The amount type wheels 215 are set by segments 219, (Figs. 6 and 12). These segments, carried on arms 220, (Figs. 2, 12 and 42) of the type setting segments 100, 101, and 102 pivoted on the cross rod 61, which segments are differentially positioned by depression of the amount keys through the differential cam slots 58, as above described. The differential movement of the segments 219 is transmitted to the amount type wheels 215 by long-toothed intermediate gears 221 (Fig. 12) rotatably mounted on the rod 212, which gears 221 mesh with the segments 219 and with the type wheels 215.

The amount type wheels 215 normally present their zero positions to the printing line and are moved to printing position as the amount keys are depressed. As soon as the amount type wheels are set, a normally withdrawn aligner bar 222 (Fig. 23) carried on the end of an aligner arm 223 of a lever 224 pivoted on a stud 230 projecting from the bracket 211, is rocked by means to be described later, into the inter-tooth spaces of the intermediate gears 221 to align these gears and the amount type wheels 215 while the impression is being taken therefrom. As soon as the pressure is removed from the depressed keys and the key coupler 55 commences its restoring movement, the aligner 222 is carried out of engagement with the intermediate gears 221, which gears and the type wheels 215 are then restored to zero positions.

The aligner 222 is operated from the key coupler 55 by the following mechanism and in the following manner:

A stud 231 (Fig. 25) on one arm 232 of a lever 233, mounted on the shaft 111 and having its other arm 234 secured to the end of the key coupler 55, is embraced by a bifurcated arm 235 pivoted on the rod 212, previously described, on which the intermediate gears 221 are mounted. A stud 236 on an arm 237, also pivoted on the rod 212 is secured to, but spaced apart from, the arm 235 by a spacer 238, projects through a bifurcated arm 239 fast on a short rock shaft 240 journaled in the printer brackets 210 and 211.

The slot embracing the stud 236 on the arm 237 is concentric with the stud 212 a short distance in each direction from the stud 236, so that at the beginning of the operation, the arm 239 and the shaft 240 remain at rest while the stud 236 travels a short distance. Likewise the arm 239 and the shaft 240 come to rest shortly before the key coupler 55 reaches the lower limit of its travel.

When a key is depressed, rocking the key coupler 55 clockwise, the stud 231 on the arm 232 rocks the spaced arms 235 and 237 counter-clockwise, and by the stud 236 rocks the arm 239 and the shaft 240 clockwise, at which movement a cam arm 241 (Fig. 23) fast on the shaft 240 and having a cam slot 242 therein embracing a stud 243 projecting from the other arm 244 of the aligner lever 224, rocks the aligner lever 224 clockwise to insert the aligner bar 222 into the proper spaces on the intermediate gear 221. It will be noted, by reference to Figs. 23 and 25 of the drawings, that the configuration of the cam slot 242 is such that it rocks the aligner 222 into engagement with the gears 221 near the end of its clockwise movement and disengages the aligner 222 shortly after the beginning of the counter-clockwise movement.

The consecutive number type wheels 216 (Figs. 6 and 13) are advanced one step at each operation of the machine by the usual spring-pressed tined pawl 245 (Fig. 13) carried between a pair of yoked arms 246 and 247 pivoted on the shaft 209, one on each side of the group of consecutive number type wheels, cooperating with ratchets 248, one secured to the side of each of the type wheels 216. A bifurcated arm 249, fast on the shaft 240, embraces a stud 255 projecting from the arm 226. The shaft 240, it will be remembered, is given a rocking movement first clockwise, and then counter-clockwise by the mechanism illustrated in Fig. 25, at each operation of the machine. This movement first rocks the yoked arms 246 and 247 counter-clockwise to advance the consecutive number type wheel 216 of lowest order one step, and then rocks the arm clockwise to retract the tined pawl 245.

It is desirable, periodically, say for instance at the end of a day's or week's business, to reset the consecutive number type wheels 216 to zero. This is done in the usual manner, that is, by rotating the grooved shaft 209, on which the type wheels 216 rotate, in the direction, counter-clockwise, as viewed in Fig. 13, in which the type wheels 216 are advanced. As the grooved shaft 209 rotates, it picks up spring-pressed pawls, (not shown), one pivoted on the side of each consecutive number wheel 216 and carries these wheels therewith to zero position.

The shaft 209 is rotated manually by a knurled wheel 256 (Figs. 2 and 6) journaled on the stud 214 (Fig. 12), and being secured to one end of a sleeve 257 surrounding the stud. A gear 258, secured to the opposite end of the sleeve from the wheel 256 meshes with an intermediate partial gear 259, rotatably mounted on the shaft 240, and which in turn meshes with a gear 260 fast on the shaft 209.

It can be seen that rotation of the knurled wheel 256, counter-clockwise, as viewed in Fig. 12, rotates the sleeve 257 and the gear 258 in the same direction, rotating the intermediate gear 259 clockwise to turn the gears 260 and the shaft 209 counter-clockwise for the purpose just described.

After the consecutive number wheels 260 are restored to their zero position the knurled wheel 256 is rotated clockwise to rotate the shaft 209 idly in the same direction to its normal position.

A stud 275 (Fig. 12) projects inwardly from the printer bracket 211 into a slot 276 in the gear 259, to limit the movement thereof to arrest the knurled wheel 256 when the consecutive number type wheels reach zero, and when the knurled wheel is returned to its normal position.

The date type wheels 217 (Fig. 6) are set to the desired position manually by knurled wheels 261, similar to the resetting wheel 256, but having the indicia of their respective date type wheels engraved on the periphery thereof. Gears 262, one secured to the side of each of the knurled wheels 261, mesh with intermediate gears 263, exactly like gear 259 for the consecutive number resetting mechanism, journaled on the shaft 240, mesh with their date type wheels to communicate manual adjustment of the knurled wheels 261 to their respective date type wheels.

The stud 275 (Fig. 12), extends into s'ots in the intermediate gears 263, which slots are similar to the slots 276 in the gears 259, to limit the movement of the knurled wheels 261 at both ends of their travel.

Spring-pressed aligner arms 250 (Fig. 12) carry studs 251 coacting with the teeth of the gears 263 to retain the date type wheels and their respective setting mechanism in positions to which they are severally set.

A special setting mechanism is provided to set the clerk's type wheel 218 to the desired position. This special setting mechanism includes a setting lever 264 (Figs. 1, 6 and 12) secured on the end of a short shaft 265, journaled in the bracket 211, a bearing 266 being secured to the bracket to provide stability for the shaft.

A toothed segment 267 fast on the inner end of the shaft 265 meshes with a partial gear 268 secured to the side of an intermediate gear 269 exactly like the gears 221 for the amount type wheels, and which gear 269 meshes with the clerks' type wheel 218.

The lever 264 projects upwardly through a slot in the angular face of the cabinet 37 (see Figs. 1 and 3) where it may be conveniently grasped by the operator and set to the desired character engraved on an index plate 270 secured to the top of the cabinet, thus rotating the type wheels 218 to bring the corresponding character on the printing wheel 218 to the printing position.

An aligner, comprising a stud 271 (Fig. 10) carried on the free end of an arm 272 of a bell crank 273 journaled on the shaft 240 to the other arm 274 of which bell crank is attached a spring 280, cooperates with the teeth of the intermediate gear 269 to resiliently align and hold the clerk's type wheel and the setting mechanism therefor in the position to which it is set. The bell crank 273 is provided with a clearance slot 277 to clear the above mentioned limiting stud 275. (See also Fig. 12.)

*Check printing operation*

After the type wheels 215, 216, 217, and 218 are adjusted and aligned, an impression arm is operated to take an impression therefrom on a check which is then fed forwardly and severed from the check web.

The impression arm, the web on which the impressions are made, the web feed tension rollers and the ink ribbon feeding and reversing mechanism are all mounted on a hinged framework which is easily and quickly raised to render other mechanism accessible. This hinged frame will be described in detail later. In general, it includes a pair of spaced arms 281 and 282 (Figs. 12 and 18) fast on a shaft 283 hinged on a pintle 284 secured to the right side frame 30 of the machine, and a pintle 285 secured to the intermediate frame 89. The hinged frame is normally latched in its lower position by a spring-pressed latch arm 286 pivoted on a stud projecting from the side frame 30, normally hooked over a stud 287 projecting laterally from the arm 281 of the hinged frame. The latch 286 may be manually rocked to disengage it from the stud 287 whereupon the hinged frame is free to be rotated upwardly on its pintles 284 and 285 for the purpose mentioned above.

The check printing hammer, as stated above, is carried by the hinged frame and is swung upwardly therewith when it is desired to gain access to the ink ribbon lying directly thereabove. This hammer comprises a pair of spaced arms 288 and 289 (Figs. 12, 15 and 18), pivotally supported on the arms 281 and 282 respectively, of the hinged frame. The hammer arms 288 and 289 are joined together at their forward ends by a yoke 290 (Fig. 15), the sides of which are bent downwardly to form an inverted channel into which is forced a platen 291 backed by a metal plate 292.

Set screws 293 are locked in a plate 294 secured to the top of the yoke 290 by lock studs 295, the purpose of which screws 293 is to adjust or level the platen 291 so that it strikes the type properly. The platen 291 is adapted, when operated, to take impressions from the type wheels 215, 216, 217 and 218, and from an electrotype 296 (Fig. 6) suitably supported in the printer brackets 210 and 211.

Figure 16:
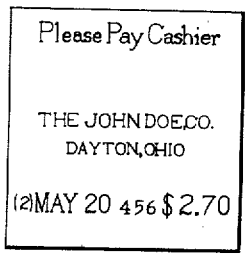
Fig. 16 is a fac-simile of the receipt issued by the machine.

A channel bar 297, (Fig. 5), having its upturned ends secured one to each of the hammer arms 288 and 289 in rear of the yoke 290, carries a narrow platen 298, adapted when the hammer is operated, to strike and take impressions from an electrotype 299, (Fig. 6), also suitably supported in the printer brackets 210 and 211. The electros 296 and 299 may contain any legend it is desired to print on the issuing check, a facsimile of which appears in Fig. 16 of the drawings. The platen 298 may be leveled or adjusted by set screws 305 in a bar 306 secured to the top of the channel bars 297 and locked in place by lock nuts 307.

Mechanism is provided to operate the check printing hammer from the key coupler 55 at substantially the end of its clockwise travel, that is, shortly before the end of the downward stroke of the key or keys depressed.

A link 308 (Fig. 15) connects the arm 232 of the lever 233 with a hammer drive arm 309 pivotally supported on the cross rod 61. As the key coupler 55 rocks clockwise under the influence of the particular key or keys being operated, the link 308 draws the drive arm 309 also in a clockwise direction to bring a by-pass pawl 310, pivoted on a stud 311 projecting laterally from the free end of the arm 309, into contact with a flattened stud 312 on the rear end of a floating operating lever 313. A spring 314 normally presses a rearwardly extending arm 315 of the pawl 310 against a stud 316 on which the link 308 is pivoted, thus limiting the counter-clockwise rotation of the pawl 310 about the stud 311. A slot 317 in the floating lever 313 surrounds a stud 318 projecting from the hinged frame arm 281 and on which the hammer arm 288 is pivoted. The bifurcated right-hand end, as viewed in Fig. 15, of the floating lever 313 embraces a projection 319 on the arm 281 of the hinged hammer frame. A spring 320 normally presses a face 321 of the floating lever upwardly against a stud 322 on the arm 281 of the hinged frame and also normally presses the bottom of the slot 317 upwardly against the stud 318.

There is also a floating lever 323 (Fig. 12) similar to the floating lever 313, associated with the hammer arm 289. A slot 324 in this lever 323 surrounds a stud 330 projecting from the frame 282, on which stud the hammer arm 289 pivots. The right-hand end, as viewed in Fig. 12 of the lever 323 is bifurcated to embrace a projection 331 on the arm 289, and a spring 332 presses a tail 333 on a rearwardly extending arm 334 of the lever against the underside of a stud 335 on a projection of the frame 282, the spring 332 at the same time presses the bottom of the slot 344 upwardly against the stud 330.

As the drive arm 309 continues its clockwise travel the forward end of the by-pass pawl 310 picks up the flattened stud 312 and rocks the operating lever 313 counter-clockwise about the stud 318 as a fulcrum, the spring 320 holding the bottom of the slot 317 there-against. This counter-clockwise rotation of the operating lever 313, by its bifurcated right-hand end embracing the stud 319, rocks the hammer arms 288—289 counter-clockwise therewith. This retraction of the hammer frame, by the stud 331 being embraced by the bifurcated end of the floating lever 323, rocks this lever also counter-clockwise against the tension of the spring 332. The spring 332 holds the bottom of the slot 324 against the stud 330 causing the lever 323 to fulcrum on this stud.

Very near the end of the clockwise travel of the drive arm 309, the stud 312 escapes the pawl 310, whereupon the spring 320 rocks the operating lever 313 sharply clockwise, the lever still fulcruming on the stud 318, and, by the connection 319, rocks the hammer arms 288 and 289 sharply clockwise therewith to take the impression. The stud 331 (Fig. 12) on the hammer arm 289, rocks the lever 323 clockwise until the face 321 of the lever 313 and the tail 333 of the lever 323 strike their respective studs 322 and 335. At this time the momentum of the hammer carries it further clockwise, the studs 319 and 331 lowering the floating levers 313 and 323, the slots 317 and 324 moving downwardly over their respective studs 318 and 330. The levers 313 and 323 fulcrum at this time on their respective studs 32 (Fig. 15) and 335 (Fig. 12), due to the tension of the springs 320 and 332.

This continued movement of the hammer under the influence of its momentum, caused by the sudden contraction of the spring 320, throws the platens 291 and 298 sharply against the several types described above, slightly tensioning the springs 320 and 322, to take the impression therefrom. The somewhat resilient platens rebound from the type, throwing the hammer slightly counter-clockwise which, by the studs 319 and 331, assisted by the springs 320 and 332 rocks the floating levers 313 and 323 counter-clockwise, the studs 322 and 335 acting as fulcrums until the slots 317 and 324, passing upwardly over their studs 318 and 320 respectively, strike the bottoms thereof, whereupon the remaining rebound momentum of the hammer is dissipated by the springs 320 and 332. These springs now act to hold the floating levers 313 and 323 with the bottom of the slots 317 and 324 in contact with the studs 318 and 330 respectively, and the face 321 and the tail 333 in contact with the studs 322 and 335, thereby holding the hammer slightly retracted and preventing further rebound of the hammer.

As the key coupler 55 now commences its downward or counter-clockwise travel and the arm 232 by the link 308 rocks the drive arm 309 also counter-clockwise, the nose of the pawl 310 encounters the stud 312, rocking the pawl slightly clockwise to permit the arm 309 to complete its restoring movement. As soon as the pawl 310 escapes the stud 312 the spring 314 restores it to its normal position with its nose just above the flattened stud 312.

*Ink ribbon*

To enable the impression hammer to make the impression on the check web, an ink ribbon 336 (Fig. 21) is provided. Suitable mechanism is provided to feed the ribbon 336 at each operation of the machine and to reverse the direction of feed when the ribbon is entirely exhausted from one of a pair of ribbon spools 326 and 327 (Fig. 2), the end flanges of which form ratchets 337 and 338 (Fig. 21) suitably supported in the machine. The spool 326 is rotatably supported in a suitable bracket 328 secured to the right side frame 30 of the machine, and the spool 327 being similarly supported in a bracket 329 secured to the intermediate frame 89. The ink ribbon 336 passes from the spools 326 and 327 downwardly beneath guide fingers 339 and 340, extending rearwardly from the heads of the hinged hammer frame arms 281 and 282, respectively.

To operate the ribbon feeding and reversing mechanism, an angular cam slot 341 in the enlarged upper body 342 of a feed pitman 343 embrace a stud 344 projecting from a downwardly extending tail 345 of a transverse feed slide 346, slidably supported in small rectangular slots (see Fig. 12), in the heads of the frame arms 281 and 282. A slot 347 (Fig. 25) in a downwardly extending leg 348 bent at right angles to the pitman 343, embraces a projection 349 on the bifurcated drive arm 239, previously described, fast on the rock shaft 240. A headed guide stud 355 (Fig. 21) on the pitman 343, projecting through a slot 356 in an angular bracket 357, secured to the right side frame 30 of the machine, guides the pitman in its vertical travel.

It will be remembered that the key coupler 55 by the stud 231 (Fig. 25) on the arm 232 secured thereto rocks the hubbed arms 235 and 237 to rock the bifurcated arm 239 and the shaft 240 first clockwise and then counter-clockwise. This movement, through the pin and slot connection 347 and 349 first moves the pitman 343 upwardly and then downwardly to normal position, which vertical reciprocating movement is transmitted to the transverse feed slide 346 by the cam slot 341 and the stud 344 to draw the slide first toward the right, and then, as the pitman is lowered, shove the slide toward the left, as viewed in Fig. 21.

A pair of feed pawls 358 and 359 (Fig. 21) are pivotally carried on a shiftable pawl carrier 360 having a pair of headed studs 361 projecting through horizontal slots 362 in the transverse slide 346. The slots 362 are enlarged at their right-hand ends, as viewed in Fig. 21, to facilitate assembly and disassembly of the pawl carrier 360 on the slide 346. The pawl carrier 360 is yieldingly latched in one of its two lateral positions relative to the slide 346 by a detent 363 pivoted on the pawl carrier 360 and having one of a pair of recesses 364 formed in the lower edge thereof, pressed over a stud 365 by a spring 366 compressed between an ear 367 on the pawl carrier and a spring pilot on the top of the detent 363. For purposes of assembly the stud 365 is mounted on a small plate 368 secured to the forward side of the slide 346.

The assembled unit, including the slide 346, pawl carrier 360, detent 363, and plate 368, is assembled in the machine by first inserting the slide 346 into the small rectangular slot (Fig. 12), in the head of the frame arms 281 and 282, the slide being passed through the arm 281 first. After the slide 346 is in position, the pawl carrier 360, upon which the pawls 358 and 359 and the detent 363 are mounted, is attached to the slide 346 by passing the studs 361 through the enlarged ends of the slots 362, and then shifting the pawl carrier to the left. Thereafter the plate 368 is attached to the slide by inserting the stud 365 into the opening in the slide 346 and pawl carrier 360, and inserting the screw 376. The plate 368 has a tail 375 to hold the unit in place when the arms 281 and 282 are rocked about the pivot 285 (Fig. 12), and the stud 344 is withdrawn from the cam slot 341. The end of the tail 375 strikes the arm 281 to limit the movement of the units toward the right (Fig. 21) to prevent the left end of the slide 346 from shifting out of the opening in arm 282, and the tail 345 on the slide 346 limits the movement toward the left. The tails 375 and 345 also guide the studs 344 back into the cam slot 341 when the arms 281 and 282 are lowered into their operating positions.

As the pitman 343 travels upwardly, under the influence of the drive arm 239 on the rock shaft 240, the cam slot 341, acting on the stud 344, shifts the transverse slide 346 toward the right, as viewed in Fig. 21, engaging the feed pawl 358 with the ratchet 337 to rotate the ribbon spool 326, located near the side frame 30, one step of movement to wind the ribbon 336 thereon, unwinding said ribbon from the spool 327. Downward movement of the pitman 343 shoves the transverse slide 346 toward the left, as viewed in Fig. 21, to the position in which the parts are shown in this figure, the weight of the feed pawl 358, as its nose rides off of the ratchet 337 restoring the pawl to its normal position with its tail resting against the under side of the ear 367 to limit the clockwise motion of the pawl.

*Ribbon reverse*

After the machine has been operated a certain number of times, the ribbon 336 is all wound on the spool 326 and is all exhausted from the spool 327. When the machine is operated with this condition existing, and the pitman 343 draws the slide 346 toward the right, the pawl 358 meets with the resistance of the taut ribbon and is held against movement toward the right. As the pitman 343 continues its upward movement to give the transverse slide 346 its full stroke toward the right, the coupling stud 365 cams the coupling detent 363 upwardly and seats itself in the recess 364.

Now, when the pitman 343 shoves the slide 346 toward the left, the pawl 359 is brought into contact with the ratchet 338 on the ribbon spool 327 and rotates this spool counter clockwise to rewind the ribbon thereon, this direction of feed continuing until the ribbon is exhausted from the spool 326 when the direction of feed is again reversed.

*Check paper feed*

The paper, on which the checks are to be printed, is fed from a supply roll, indicated at 369 (Fig. 12) by dot and dash lines. It passes between the platens 291 and 298 carried by the impression hammer, and the ink ribbon 336 which passes between the check web and the types. The check is fed at each operation after the impression is made thereon, the feeding mechanism being retracted idly on the down stroke of the keys and is operated on the up stroke to feed the check through a severing device, to be described later, where it is automatically severed from the web, the severed portion protruding out of the chute 204 in the cabinet from which the operator may readily possess himself thereof. The mechanism for feeding the check will now be described.

A pair of knurled feed rollers 370 and 371 (Fig. 27) are fast on a short shaft 372 journaled in a bearing 373 in the printer bracket 211 and in a knife block 374, secured to the printer frame 210 and having secured to the forward side thereof a stationary knife blade 380 forming a part of the severing device, to be described later. The rollers 370 and 371 being secured to the shaft 372, adjacent the bearing 373 and the block 374, respectively, prevents longitudinal movement of the shaft. The left-hand end of the shaft 372 is hollow and terminates in a flange 381 having a shouldered recess 382 (Fig. 24), in the periphery thereof. A drive pawl 383 (Fig. 24) pivotally carried by a drive arm 384 journaled on a pin 385 inserted therethrough and into the hollow end of the shaft 372 cooperates with the shouldered recess 382. A toothed segment 386 (Fig. 25), carried by an arm 387 fast on the rock shaft 240 meshes with a gear 388 mounted on the pin 385 and secured to the drive arm 384.

It will be remembered that the shaft 240 at the down stroke of the key or keys is rocked clockwise, carrying the segment 386 therewith and rotating the gear 388 and the drive arm 384 counter-clockwise slightly more than one complete rotation. At this counter-clockwise rotation of the drive arm 384 the drive pawl 383, being constantly held in contact with the flange 381 by a spring 389 rides on the periphery of the flange until, near the end of the counter-clockwise rotation, when the pawl, under the influence of the spring 389, drops into the shouldered recess 382.

As the segment 386 nears the end of its clockwise travel, a projection 390 on the arm 387 contacts a raised face 391 on a dog 392 pivoted on the shaft 240, and rocks the dog clockwise therewith the short remaining distance to move the nose of the dog out of the path of a shouldered projection 393 on the periphery of a retaining disk 394 secured on the inner side of the flange 381. A detent 395 (Fig. 22) pivotally supported on the printer bracket 211 cooperates with a notch 379 in the periphery of the disk 394 to prevent retrograde movement of the feed rollers at the counter-clockwise rotation of the gear 388, feed arm 384, and pawl 393. The purpose of the dog 392 is to prevent overthrow of the feed rollers 370 and 371 at the end of the return stroke of the segment 386 and the necessity of removing the nose of the dog from the path of the projection 393 before starting the return or feeding movement of the segment 386 can be easily seen.

Now, as the depressed key, or keys, begin their upward stroke under the influence of the key coupler 55, the train of mechanism illustrated in Fig. 25 rocks the shaft 240 and segment 386 counter-clockwise, rotating the gear 388 and the drive arm 384 clockwise slightly more than 360 degrees, the drive pawl 383 rotating the flange 381, shaft 372 and the feed rollers 370 and 371 clockwise therewith.

At the beginning of the return stroke of the segment 386 the projection 390 on the arm 387 moving away from the face 391 permits a spring 396 common to the dog 392 and the detent 395 to rock the dog counter-clockwise into contact with the periphery of the disk 394. In the meantime, however, the shouldered projection 393 has been rotated clockwise past the nose of the dog. As the check feed device arrives at the end of its feeding movement, the detent 395 (Fig. 22) under the influence of a spring 396, rocks into its shouldered recess in the periphery of the disk 394 to prevent retrograde or counter-clockwise movement of the disk 394 and the feed rollers 370 and 371.

To enable the feed rollers 370 and 371 to grip the check web in order to feed it, the usual tension means is provided. In the illustrative embodiment of the machine this tension means comprises a pair of knurled rollers 397 and 398 (Figs. 18 and 26) fast on a short shaft 399 (see also Fig. 12), the ends of which project through slots 405 in the arms 281 and 282 of the hinged hammer frame. Tension is obtained by springs 406 and 407 coiled about the stems of spring pilots 408 and 409 and compressed between shoulders on the pilots and guide studs 410 and 411 secured on the arms 281 and 282, the stems of the pilots being extended through holes in the studs 410 and 411. The lower end of the pilots 408 and 409 are enlarged to surround the shaft 399 near its ends, whereby the springs 406 and 407 by the shaft 399 press the tension rollers 397 and 398 downwardly against the feed rollers 370 and 371, respectively.

The enlarged lower ends of the pilots 408 and 409 extend downwardly, to guide the check web from the feed roller to the knife.

Check severing device

After the impressions are made and the web is fed forwardly a severing device is operated to shear the printed check from the web. This severing device includes the stationary knife blade 389 (Figs. 12, 14 and 27) secured to the knife block 374, described above, and a shear blade 412 pivoted on a stud 413 on a bracket 414 secured to the side frame 30. A stud 415 on an arm 416, also pivoted on the stud 413 and secured to the shear blade 412, projects through a slot 417 in a projection 418 bent at right angles to a thrust link 419. A spring 420 having one of its ends attached to a projection on the shear arm 416 normally presses a finger 425 (Fig. 14) of the shear arm 416 against the frame 30 to arrest the shear blade 412 in its closed position. The lower end of the thrust link 419 is slotted at 421 (Fig. 12) to receive a stud 422 on a long forwardly projecting arm 423 pivoted on the cross rod 48. A head on the stud 422 prevents the stud from escaping laterally from the slot 421.

When one, or more, of the keys are depressed, rocking the key coupler 55 clockwise, a tappet 424 (Fig. 12) fast on the shaft 111 strikes a shoulder 430 projecting rearwardly from the arm 423 and rocks this arm counter-clockwise, the stud 422 striking the top wall of the slot 421, to thrust the link 419 upwardly, which, by the pin and slot connection 415 and 417 (Fig. 14) rocks the arm 416 and the shear blade 412 clockwise, creating an opening between the shear blade 412 and the stationary blade 389, sufficiently large to admit the check web. This cocking movement, or opening, of the shear blade 412 occurs on the down stroke of the key at the same time the segment 386 (Figs. 12 and 25) is retracting the check feed roller drive arm 384, as above described.

The blade 412 is restrained in its retracted position until the end of the operation in order that the check may be fed therethrough to its position to be severed. This is done by a latch 431 (Fig. 12).

The key coupler 55 resting in its normal position, restrains the latch 431 pivoted on a stud 432 projecting inwardly from the frame 30, against the tension of a latch spring 433. An upwardly extending finger 434 on the latch 431 is provided with two steps or shoulders 435 and 436 to cooperate with a projection 437 on an arm 438 pivoted on the rod 48 connected to the arm 423 by yoke 439. Normally the shoulder 435 of the latch finger 434 restrains the arm 423, yoke 439 and arm 438 from rocking clockwise under the influence of the weight of the arm 423, although the shoulder is so placed that the pin 422 normally lies out of operative connection with the upper end of slot 421.

When the key coupler 55, actuated by depression of a key, begins its clockwise travel, it releases the latch 431 to the action of its spring 433, and continued clockwise travel of the key coupler rocks the arm 423 counter-clockwise to open the shear blade 412, as above described. When the projection 437, rocking counter-clockwise, passes the shoulder 436, the spring 433 rocks the latch 431 clockwise to hook the shoulder 436 over the projection 437 thereby latching the shears in its open position.

The check web is fed by the mechanism disclosed in Fig. 25 and described above, on the down stroke of the key coupler 55 and then, quite near the end of the operation of the machine, the key coupler 55 now traveling counter-clockwise, the coupling bar 56 strikes and rocks the latch 431 counter-clockwise to free the shoulder 436 from the projection 437 whereupon the spring 420 (Fig. 14) assisted by the weight of the link 419 rocks the shear blade 412 sharply counter-clockwise to sever the printed check from the web.

When the web is fed, as above described, the printed check protrudes from the aperture 203 in the bottom of the check chute 204 (Fig. 1) secured to the curve of the cabinet 37. After the check is sheared from the web it reposes in the chute 204 from where the operator removes it.

Total printer

It was stated above that the amount of each transaction entered into the machine is accumulated on the totalizer previously described. This totalizer is not visible to the operator and in order to ascertain the total amount standing on the totalizer it is necessary to take an impression therefrom on a record material, the totalizer as above described being provided with printing wheels instead of the usual reading wheels. The total printing mechanism is not operated by operation of the machine, but a normally inaccessible printing hammer is operated manually to print the total.

Figure 29:
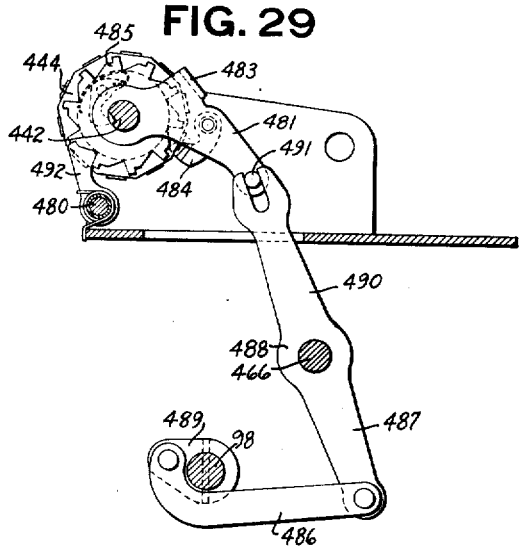
Fig. 29 is a detail view of the customer counter and its operating mechanism therefor.
Figure 30:
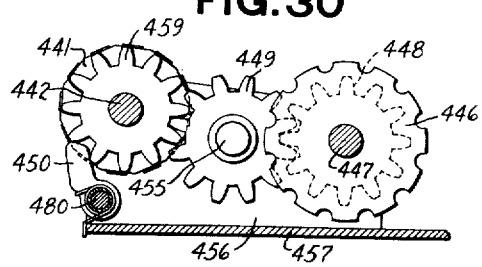
Fig. 30 is a sectional view taken on line 30—30 Fig. 28.
Figure 31:
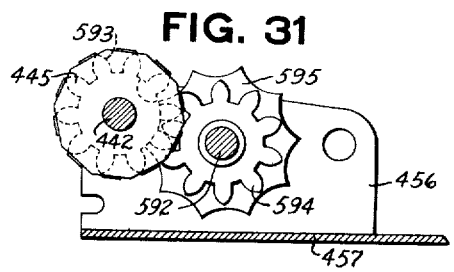
Fig. 31 is a sectional view of the reset counter operating means taken on line 31—31, Fig. 28.

In addition to printing the total amount standing on the totalizer, this manually operated hammer prints the date from manually set type wheels 441 (Fig. 28) rotatably mounted on a shaft 442 (Fig. 30) journaled in the intermediate frames 88 and 89, a number indicating the number of times the machine has been operated by depression of the "no-sale" key, this number being printed from automatically advanced type wheels 443 (Fig. 28), also rotatably mounted on the shaft 442. A number denoting the number of times the machine has been operated is printed from type wheels 444 (see also Fig. 29), rotatably mounted on the shaft 442 and which are automatically advanced one step at each operation of the machine. A group of type wheels 445 (see also Fig. 31), on the shaft 442 print a number indicating the number of times the totalizer has been reset to zero.

The date type wheels 441 are manually set by knurled setting wheels 446 (Figs. 28 and 30) journaled on a rod 447 extending between the intermediate frames 88 and 89. These knurled wheels have gears 448 fast on the sides thereof, meshing with intermediate gears 449 rotatably mounted on a stud 455 projecting from a bracket 456 bent upwardly from a plate 457, the bracket 456 embracing and being supported on the shaft 442 and on the rod 447. Another bracket 458, bent upwardly from the other end of the plate 457 also embraces and is supported by the shaft 442 and the rod 447. The intermediate gears 449 mesh with gears 459, one fast on the side of each of the date type wheels 441. The gears 448, 449 and 459 transmit the adjustment of the knurled date setting wheels 446 to the date type wheels 441 to set them according to the position to which knurled setting wheels 446 are moved. The date type wheels are held in their set positions by a series of spring-pressed pawls 450 journaled on a rod 480 and cooperating with the gears 459.

As stated above, the type wheel 443 of lowest order is advanced one step at the time the machine is operated by depression of the "no-sale" key. This is accomplished in the following manner:

A stud 460 (Fig. 7) projecting from the "no-sale" key 47 is embraced by a forked arm 461 fast on a shaft 462 having one of its ends journaled in the left side frame 31 of the machine and its other end journaled in a bracket (not shown) secured to the sub-base 31 of the machine. A link 463 (Fig. 3) connects an arm 464 fast on the other end of the shaft 462 from the arm 461, and an arm 465 fast on a shaft 466 journaled in the intermediate frames 88 and 89.

Figure 20:
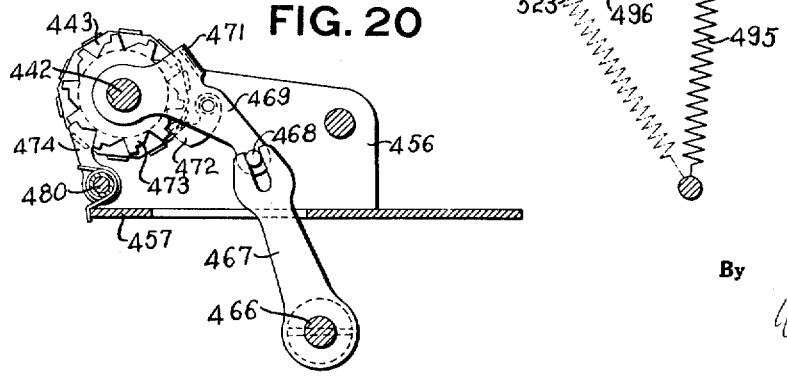
Fig. 20 is a detail view of the "no sale" counter and its operating mechanism.

Depression of the "no-sale" key 47 causes the stud 460 to rock the arm 461 and shaft 462 counter-clockwise which, by the arm 464 (Fig. 3) link 463 and arm 465, rocks the shaft 466 also counter-clockwise. The free end of an arm 467 (Fig. 20) fast on the shaft 466 is bifurcated and straddles a stud 468 on an arm 469 journaled on the shaft 442 adjacent the "no-sale" type wheels 443, which arm 469 is connected to an arm 470, also journaled on the shaft 442, but on the other side of the type wheels 443 from the arm 469, by a yoke 471. Between them the arms 469 and 470 carry a tined pawl 472 the tines of which are spring-pressed against ratchets 473, one of which is secured to the side of each of the type wheels 443. The counter-clockwise movement of the shaft 466 and the arm 467 rocks the yoke arms 469 and 470 clockwise about the shaft 442, and causes the tined pawl 472 to advance the type wheel 443 of lowest order one step of movement.

Counter-clockwise movement of the "no-sale" key 47 (Figs. 1, 2 and 7) by the train of mechanism just described, rocks the shaft 466 (Fig. 20) and the arm 467 clockwise, rocking the yoke arms 469 and 470 counter-clockwise to retract the tined pawl 472. A spring-pressed restraining pawl 474 pivoted on a short rod 480 supported in the brackets 456 and 458 prevents retrograde movement of the type wheels 443 when the tined pawl 472 is retracted.

The customer consecutive number type wheels 444 (Figs. 28 and 29) are advanced at each operation of the machine by any key in the same manner as that described above for the "no-sale" type wheels. A pair of arms 481 and 482 pivoted on the shaft 442 and connected by a yoke 483 between them carry a tined pawl 484 spring-pressed into cooperative relation with ratchets 485, one secured to the side of each of the type wheels 444. A link 486 connects a downwardly extending arm 487 of a lever 488 pivoted on a shaft 466, with an arm 489 fast on the rock shaft 98, previously described, the other arm 490 of the lever 488 being bifurcated to embrace a stud 491 projecting from the arm 481.

It will be remembered that the shaft 98 (see Fig. 7) is rotated first counter-clockwise, as the selected key, or keys, are depressed, and then clockwise to normal during the restoring movement of the depressed key. This movement by the arm 489 and link 486 rocks lever 488 first counter-clockwise and then clockwise to normal to rock the yoke arms 481 and 482 first clockwise to advance the customer's counter type wheel 444 of lowest order one step, and then counter-clockwise to retract the pawl 484, the type wheels 444 being held against movement when the pawl is retracted by a spring-pressed restraining pawl 492 pivoted on the rod 480.

The reset counter type wheels 445 are, as above stated, advanced one step each time the totalizer is reset to zero. Mechanism for doing so will be described later in connection with the resetting mechanism.

The impressions are taken from the printing totalizer wheels 80, 81, 82 and 83, and from the special data wheels described above by means of the manually operated hammer 492 (Figs. 3 and 19) carried by a pair of hammer arms 493 swung on pintles 494, only one of which is shown herein, supported in the intermediate frames 88 and 89. A spring 495, having one of its ends attached to a curved tail 496 on the hammer arm 492, normally urges the hammer arm and the hammer to rotate clockwise about the pivot 494, which movement however, is normally prevented, or limited, by a shoulder 497 on the tail 496 abutting against a stud 498 projecting from a link 499, having its rear end pivotally connected to one arm 504 of a latch lever 505 pivoted on a stud 506 projecting from the intermediate frame 88. A stud 507 on the forward end of the link 499 slidable in a horizontal slot 508 (Fig. 33), in the intermediate frame 88, guides the link 499 in its reciprocatory movement.

The total printing hammer 492 and the totalizer are normally made inaccessible by a locked lid or door 509 (Fig. 1), the key to which lock is usually in the possession of the proprietor or his authorized agent.

Figure 17:
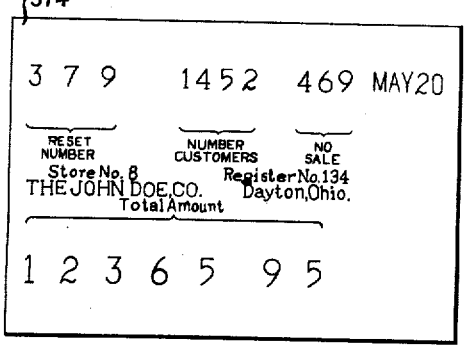
Fig. 17 is a fac-simile of the total slip printed by the total printer.
Figure 18:
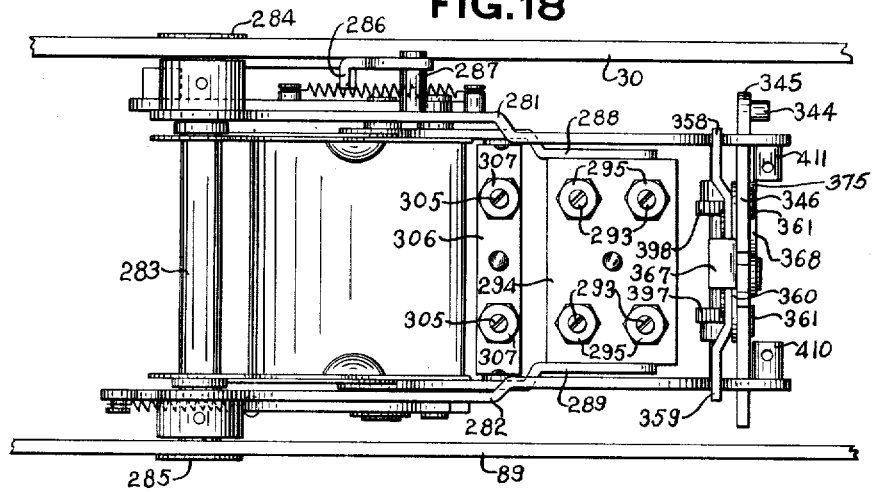
Fig. 18 is a top plan view of the check printing hammer.

When it is desired to read the totalizer the lid 509 is unlocked and raised giving access to the hammer 492 which may be struck a sharp blow throwing it downwardly to carry a platen 510 into contact with the printing totalizer type wheels (Fig. 11). At the same time a platen 511 is thrown into contact with an electrotype 512 (Fig. 19) secured to the support bar 90, and a third platen 513 secured in the hammer 492 is brought into contact with the special data type wheels (see Fig. 28). The result of this blow is an imprint such as that disclosed in Fig. 17 on the web of record material 514, which is then manually drawn out and manually detached to form a slip, a fac-simile of which is shown in Fig. 17.

The record material 514 is unwound from the supply roll 515 (Fig. 3), loosely supported in a framework 516 removably mounted on a stud 517 projecting from the intermediate frame 88 and on a similar stud 525 on the frame 89, the frame being suspended from the studs 517 and 525 by ears 518 bent upwardly from the body of the frame. The frame 516 terminates in a chute 519 (Fig. 3), through which the record material 514 passes, the chute being latched in position by the hooked latch 505 (Fig. 19), hooking over a stud 520 projecting from the upturned side of the chute 519. A spring 521 normally holds the latch 505 in its effective position and a similar latch 526 (Fig. 2), at the other side of the printer, retains the chute 519 and paper frame 516 in position.

A suitable ink ribbon (not shown) is carried on the chute 519, extending beneath the chute and being removably fastened at each side thereof.

It is sometimes desirable to remove the record material frame and paper chute 516 and 519 either to replace an exhausted supply roll 515 of paper, or to place a new ink ribbon in place on the chute 519. To do this it is necessary to rotate the hammers 492 to the position indicated by dot and dash lines in Fig. 19. Before the hammer can be so rotated, however, it is necessary to shift the stud 498 out of the path of the shoulder 497 on the curved tail 496. To do this the operator grasps the upwardly extending latch arm 505 and rocks it clockwise, as viewed in Fig. 19, thus drawing the link 499 leftward, sliding the stud 507 in its slot 508 (see Fig. 33) and displacing the stud 498 from its restraining position in the path of the shoulder 497, whereupon the spring 495 rotates the hammer clockwise until the spring centers with the pivot point of the hammer. The operator now seizes the hammer and rotates it manually further clockwise until a shallow recess 522 in the tail 496 arrives in line with the stud 498 which is immediately forced thereinto by the spring 521 latching the hammer in its fully retracted position in which it appears in Fig. 19 in dot and dash lines.

Figure 19:
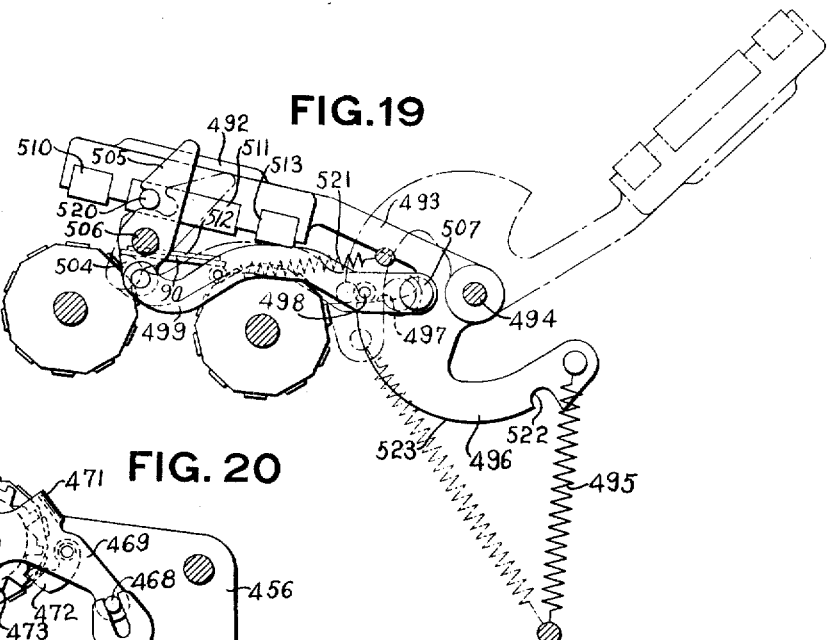
Fig. 19 is a detail view of the total printing hammer.

As the hammer is being retracted a slightly eccentric arcuate face 523 of the tail 496 wipes by the stud 498, camming the link 499 a little farther toward the left so that when the stud 498 drops into the recess 522 it will hold the latch 505 substantially in the position indicated by dot and dash lines in Fig. 19, with the hook free of stud 520.

Figure 2:
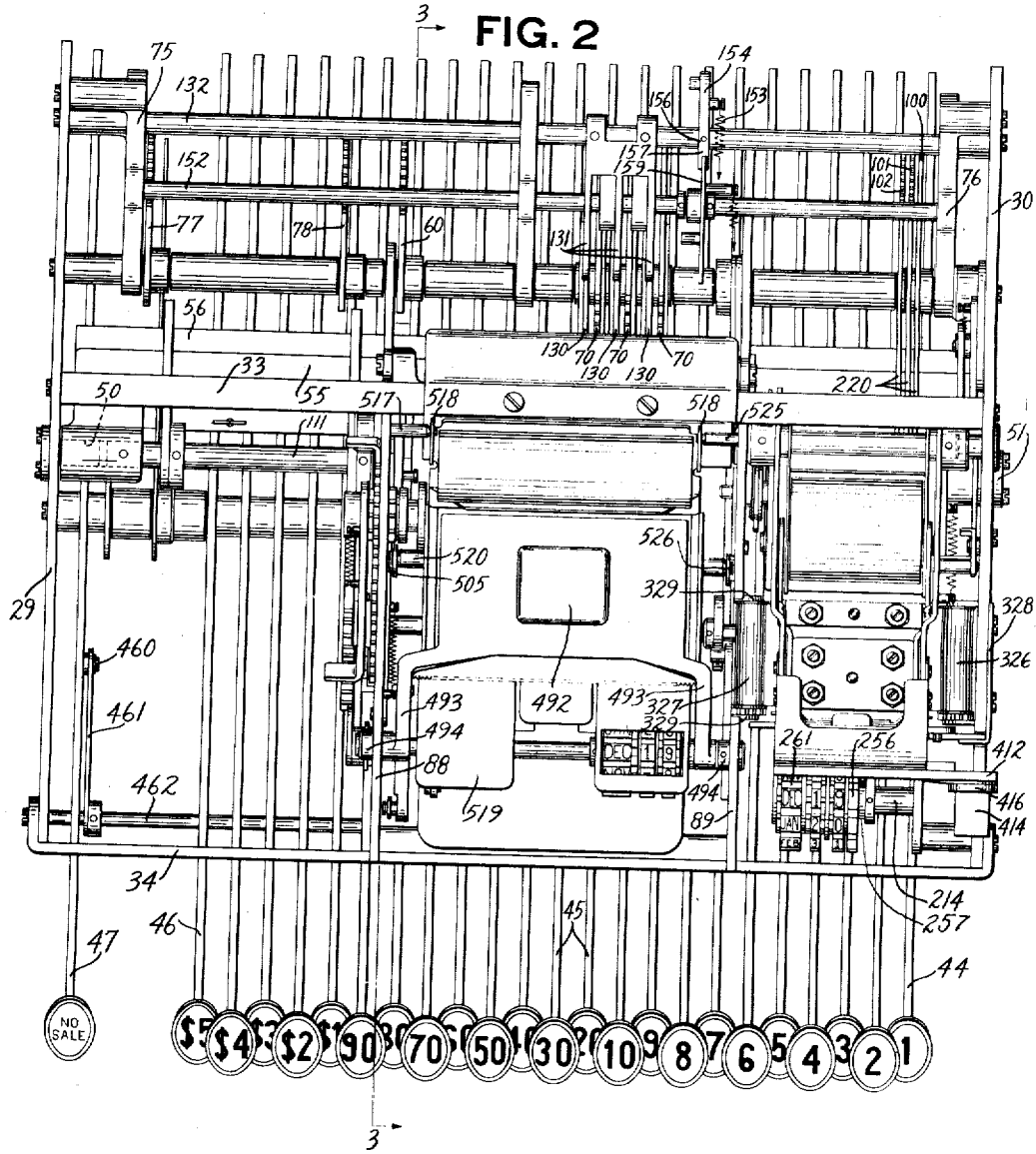
Fig. 2 is a top plan view of the machine with the cabinet removed.

The record material support frame 516 and paper chute 519 may now be removed from the machine by releasing the other latch 526 (Fig. 2). When the roll of paper or ink ribbon (not shown) has been replaced and the frame 516 and chute 519 replaced in the machine, the latch 505 is again rocked forward to draw the stud 598 out of the recess 522, releasing the hammer to the action of the spring 495 which is now tensioned to urge the hammer counter-clockwise to normal position. As soon as the shoulder 497 rocks past the stud 498 the spring 521 draws the link 499 toward the right, positioning the stud 498 in the path of the shoulder 497 and rocking the latch 505 counter-clockwise to position the hook over the stud 520 thereby retaining the record material support frame 516 and the paper chute 519 in the proper position in the machine.

*Interlocks*

Figure 28:
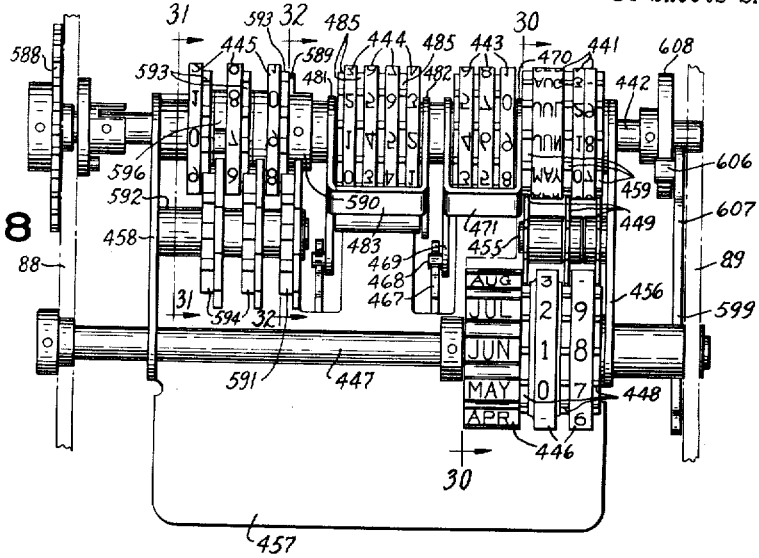
Fig. 28 is a top plan view of the type wheel line having mounted thereon a reset counter, customer's counter, no sale counter, and date type wheel. Impressions are made from this type wheel line on the issuing total record strip.

It is desired to lock the machine against operation while the total is being printed from the printing totalizer wheels 80, 81, 82 and 83, and other data are being printed from the wheels 441, 443, 444 and 445 (Fig. 28). This is accomplished in the following manner:

It will be remembered that in order to print the total it is first necessary to raise the normally locked door, or lid, 509 to gain access to the hammer 492. The lid 509 has a lock 524, which, when its key is inserted therein and turned, releases another lid or door 530 (Fig. 1) which is partially raised by a spring 504 (Fig. 41). The lid 530 may be fully raised by the proprietor and latched in its raised position, by any suitable latch mechanism (not shown). The lid 509 is latched in its closed position by a stud 531 (Fig. 33), on an arm 532 of a lever 533 pivoted on a stud 534 projecting from the intermediate frame 88, and extending through an open slot 535 in an arcuate arm 536 secured to the underside of the lid 509. Raising the lid 530 exposes a bell crank 537 pivoted on the stud 534, an upwardly extending arm 538 of which bell crank is connected to the arm 532 of the lever 533 by a stud 539 projecting through a clearance opening 540 in the intermediate frame 88, the lever 533 being back of the frame 88 and the bell crank 537 in front of the frame as viewed in Fig. 33. The other arm 541 of the bell crank 537 carries a stud 542 projecting across the plane of the mutilated disk 114, previously described, fast on the rock shaft 98.

To release the lid 509 the operator grasps an ear 543 carried at the upper end of the arm 538 to form a convenient handle therefor, and draws it forwardly, rocking the bell crank 537 clockwise to position the stud 542 in the path of the shoulder 544 of the disk 114, thereby preventing counter-clockwise rotation of this disk, the gear 113 and rock shaft 98 and consequently locking the machine against operation, as can be seen by examination of Fig. 7 of the drawings. At the same time the clockwise rotation of the bell crank 537 by the stud 539 connecting the arm 538 thereof with the arm 532 of the lever 533, rocks this lever also clockwise to remove the stud 531 from the slot 535 in the arcuate bar 536 thereby freeing the lid 509 which may now be raised to gain access to the total printing hammer 492. When the lid 509 is raised the arcuate edge of the bar 536 sweeps along to the left of the stud 531 blocking the counter-clockwise movement of the bell crank until the lid is again closed, thus locking the machine against operation while the lid 509 is raised to expose the total printing mechanism.

Another interlock is provided to prevent manipulation of the totalizer wheels 80, 81, 82, and the lowest order wheel 83, when the lid 509 is raised. This interlock includes a series of spring-pressed pawls 545 pivoted on a rod 546 extending between the totalizer frames 85 and 86, and co-operating with the gears 74, one of which is secured to each of the above-mentioned totalizer wheels. These pawls 545 are normally free to rock as the totalizer wheels are rotated by the actuators 70, 71 and 73 to add amounts thereon.

Movement of the bell crank 537 to release the lid 509 raises a locking plate 547, slidable vertically on studs 548, only one of which is shown, projecting from the cross bar 91, into the paths of the tails 549 of the pawls 545, locking them against clockwise movement, thus locking the gears 74 and their totalizer wheels against rotation.

The locking plate 547 is actuated by a pair of arms 555, pivoted on the projections 87 on which the totalizer frames 85 and 86 are pivoted. The arms 555 are joined at their rear ends by a yoke 556. The reduced forward ends of the arms 555 project through suitable openings in the lower portion of the plate 547, and a stud 557 on a projection 558 of the arm 555 adjacent the lever 533, projects through a slot in the end of the other arm 559 of the lever 533.

It can be seen that clockwise movement of the bell crank 537 and the lever 533 to lock the machine against operation and to release the lid 509, rocks the yoked arms 555 counter-clockwise to slide the locking plate 547 upwardly interposing its upper edge in the paths of the tails 549 of the locking or retaining pawls 545. This condition obtains until the lid 509 is closed when the slot 535 is repositioned opposite the stud 531 whereupon a spring 560 rocks the bell crank 537 counter-clockwise to normal position, freeing the tails 549 of the pawls 545.

*Totalizer resetting mechanism*

Figure 36:
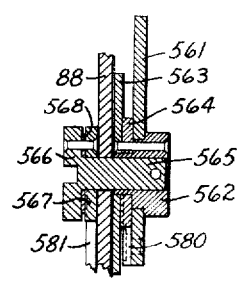
Fig. 36 is a fragmentary sectional view illustrating the method of mounting the resetting lever.

After the total and the appertinent data are printed and the slip detached from the web of the record material, it is desired to reset the totalizer to zero. The totalizer, customer's counter and no-sale counter are all restored to zero simultaneously by operation of a turn-to-zero lever 561 (Figs. 33, 34 and 36), journaled on the hub 562 of a gear 563 and of a ratchet 564, the hub, gear and ratchet being all secured together as clearly illustrated in Fig. 36. The hub 562 is fast on a short shaft 565 journaled in the intermediate frame 88, the shaft terminating in a slotted head 566, to the frame side of which head is fast a ratchet 567, spaced apart slightly from the head by a spacer disk 568. The slotted head 566 of the shaft 565 is adapted to receive a tongue 569 (Fig. 11), projecting from a hub 570 of a cam 571 (see also Fig. 3), secured on one end of the totalizer shaft 84. The groove in the head 566 is substantially horizontal in its normal position to permit the tongue 569 to slide therein when the totalizer is rocked into and out of engagement with the actuators.

A stud 575 (Figs. 33 and 34) on the frame 88 projects through a concentric slot 576 in the enlarged body of the resetting lever 561 to limit the extent of oscillatory movement of the lever.

To reset the totalizer the operator grasps an ear 574, bent outwardly from the end of the reset lever 561 to form a convenient handle, and rocks the reset lever first counter-clockwise and then clockwise (as viewed in Fig. 33), continuing this oscillatory movement of the reset lever 561 until the totalizer is reset to zero. At each counter-clockwise stroke of the reset lever a spring-pressed drive pawl 580 (Fig. 34) pivotally carried on the body of the reset member, and co-operating with the ratchet 564 to rotate the gear 563 and the shaft 565 clockwise, as viewed in Fig. 34, and counter-clockwise, as viewed in Fig. 33, one-sixth of one rotation at each stroke of the lever 561. This intermittent rotary movement is transmitted to the shaft 84 by the coupling comprising the slotted shaft 565 and the tongue 569 to rotate the shaft 84 also counter-clockwise, as viewed in Figs. 3 and 33.

Figure 35:
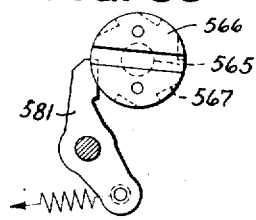
Fig. 35 is a detail view of the resetting shaft retaining dog.

The shaft 84 is grooved in the usual manner and picks up the totalizer wheels by spring-pressed pawls (not shown) carried by the wheels, and rotates them to their zero position in a manner well known in the art. A spring-pressed detent 581 (Fig. 35), pivoted on a projection of the intermediate frame 88 cooperates with the ratchet 567 secured to the side of the head 566 on the shaft 565 to prevent backward movement thereof when the reset lever 561 is retracted to draw the pawl 580 backwardly to the next notch in the ratchet 564.

The shafts 84 and 565 must be rotated 360 degrees, or one complete rotation, in order to turn all of the totalizer wheels to zero, and since there are six notches in the ratchet 564, it is necessary to oscillate the reset lever 561 six full strokes to reset the totalizer to zero.

Mention was made above of the Geneva transfer in connection with the overflow or higher order totalizer wheels 83 (Fig. 11). This transfer mechanism is not shown herein but is carried on a yoke frame 582 journaled on a rod 583 extending between the totalizer frame 85 and a bracket 584 extending rearwardly from the cross bar 91.

When restoring the main totalizer to zero, it is necessary to disengage the Geneva transfer elements (not shown) from gears 585, one of which is fast on the side of each of the totalizer wheels 83, and to bring a forked spring aligner 586 secured to the yoke frame 582, in contact with the gears 585. The Geneva transfer elements (not shown) are normally spring-urged into mesh with the gear 585 and when the shaft 84 is rotated counter-clockwise, as viewed in Fig. 3, by operation of the reset lever 561, the cam 571, fast on the end of the shaft 84, cooperates with a stud 587 on the frame 582, rocking this frame clockwise (Fig. 3) to disengage the Geneva transfer elements (not shown) and bring the spring aligners 586 into contact with the gears 585. A spring (not shown) restores the yoked bracket 582 to its normal position, and the stud 587, to its recess in the periphery of the cams 571 when the shaft 84 has completed one rotation.

The customer's counter and the no-sale counter are reset to zero simultaneously with the main totalizer, and in addition the reset counter wheel 445 (Fig. 28) of lowest order is advanced one space.

The gear 563 (Fig. 33) meshes with a gear 588 fast on the grooved shaft 442 upon the date, no-sale counter, customer's counter, and reset counter type wheels are located. Counter-clockwise rotation of the gear 563, as described above, rotates the gear 588 and shaft 442 in clockwise direction, which, by the usual grooved shaft (in this case the shaft 442), picks up the wheels 443 and 444 by their pawls (not shown) and rotates said wheels to their zero positions. The date wheels 441 and reset counted wheels 445 have no reset pawls, therefore are not reset to zero by rotation of the shaft 442.

Figure 32:
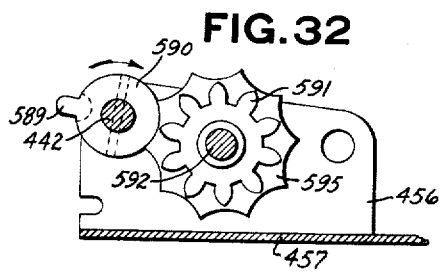
Fig. 32 is a sectional view taken on line 32—32, Fig. 28.

The reset counter is advanced at each resetting operation by a tappet 589 (Fig. 32) projecting from a disk 590 secured on the shaft 442. Each time the shaft 442 rotates to reset the customer's counter, no-sale counter and the totalizer to zero, this tappet strikes a tooth of a gear 591 journaled on a stud 592 projecting from the bracket 458 (Fig. 28), advancing the gear one space counter-clockwise, as viewed in Fig. 32. The gear 591 also meshes with a gear 593 (Fig. 31) secured to the lowest order type wheel 445, thereby advancing this type wheel one space each time the totalizer is reset to zero. Geneva transfer gears 594 also journaled on the stud 592 form couplings between the higher order wheels to effect transfer from a lower order wheel to the next higher order wheel in a manner well known in the art. Locking disks 595 secured to the gears 591 and 594 cooperating with the disks 590 and 596 secured to the type wheels 445, prevent rotation thereof until the proper time.

An interlock is provided between the lid 509 and the totalizer resetting mechanism to prevent resetting the totalizer to zero while the lid 509 is raised and to prevent raising the lid 509 while the totalizer is being reset. This interlock includes the bell crank 537 (Fig. 33), which, it will be remembered, must be rocked clockwise, as viewed in this figure to remove the stud 531 in the slot 535 from the arcuate arm 536 before the lid 509 can be raised. This clockwise movement of the bell crank 537 inserts a projection 597 on the arm 538 into a substantially square recess 598 in the periphery of the gear 563, locking the gear and the remainder of the resetting mechanism against operation while the lid 509 is in its raised position, the arcuate bar 536 locking the bell crank in its moved position until the lid is again closed when the slot 535 arriving in its position in line with the stud 531 frees the bell crank 537 and the lever 533 to the action of their spring 560 which immediately rocks them counter-clockwise and removes the projection 597 from the recess 598, thus permitting operation of the resetting mechanism. The totalizer is now free to be reset to zero and when the resetting lever 561 is given its first counter-clockwise stroke, as viewed in Fig. 33, the gear 563 rotates, carrying the recess 598 out of the path of the projection 597 and moves the teeth of the gear in front of the projection thereby blocking the clockwise movement of the bell crank 557. The stud 531 is thus held in its slot 535, locking the lid 509 in its closed position and rendering the total hammer and totalizer inaccessible until the lever 533 completes its rotation at which time the recess 598 again comes opposite the projection 597.

Figure 33:
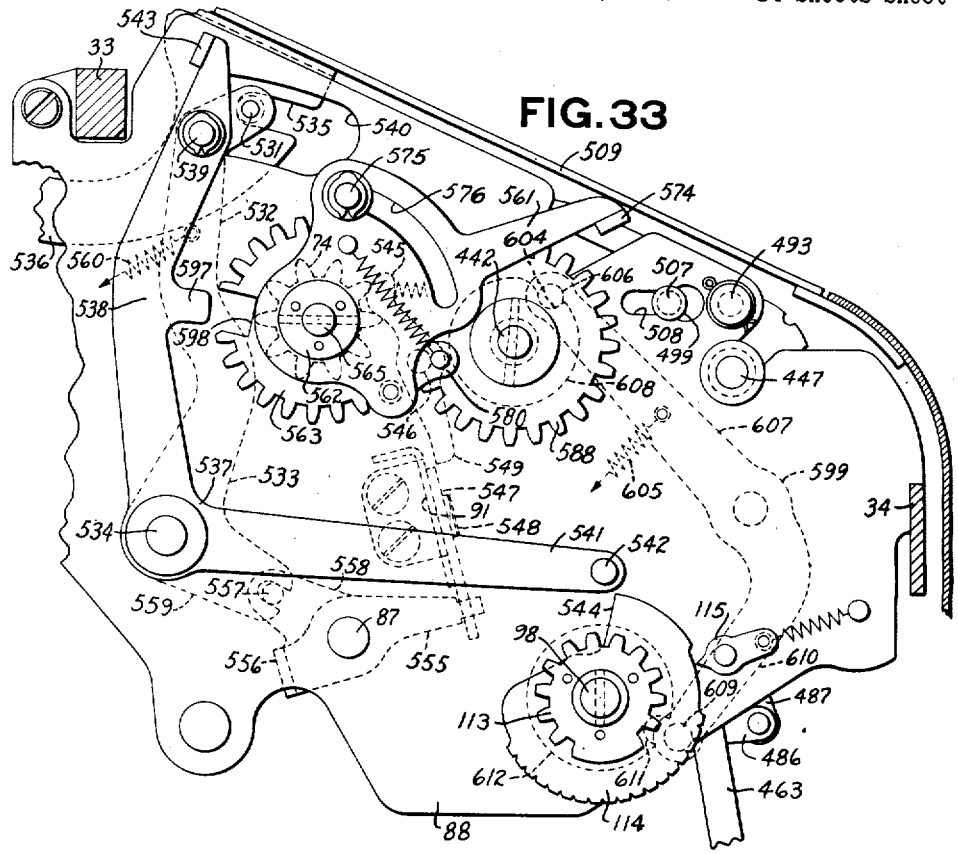
Fig. 33 is a view in left elevation of the total resetting interlocks.
Figure 34:
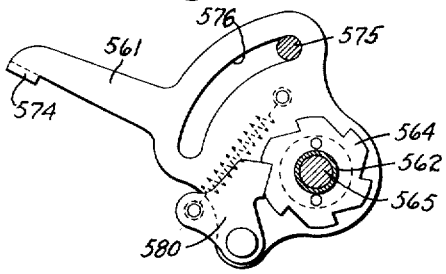
Fig. 34 is a detail view of the resetting operating levers.

Since the bell crank 537 is locked in its normal position, as shown in Fig. 33, during the total resetting operation, the stud 542 is not effective, at this time, to prevent operation of the machine. Another interlock is therefore provided to lock the machine against operation while the totalizer is being reset to zero.

This interlock includes a lever 599 (Figs. 28 and 33) pivotally supported on the intermediate frame 89. A spring 605 normally presses a stud 606 on one arm 607 of the lever 599 into a recess in the periphery of a cam 608 fast on the right-hand end as viewed in Fig. 28, of the shaft 442. It will be remembered that when the totalizer is reset, the gear 588 and shaft 442 rotate clockwise one complete rotation. As soon as the shaft 442 starts its clockwise rotation the cam 608 rocks the lever 599 clockwise against the tension of its spring 605 to move a projection 609 on the other arm 610 of the lever 599 into a recess 611 in the periphery of a locking disk 612 fast on the rock shaft 98 thus locking the shaft and therefore the machine against operation during the resetting operation.

As the shaft 442 and the cam 608 complete their 360 degrees of rotation and arrive at their home position, bringing the recess 604 in the periphery of the cam beneath the stud 606, the spring 605 rocks the lever 599 counter-clockwise to remove the projection 609 from the recess 611 in the locking disk 612 thereby freeing the machine for operation.

The lever 599 also functions to prevent resetting the totalizer to zero during an item-entering operation or a "no-sale" operation.

As soon as a key is depressed to operate the machine the segment 109 (Fig. 7) rotates the gear 113 and segment 114 counter-clockwise. This removes the recess 611 from the path of the stud 609 and presents the full periphery of the disk 612 thereto thus blocking clockwise rotation of the lever 599, which holds the stud 606 in the recess of the cam 608 and prevents rotation of the shafts 442 and 84 to reset the totalizer to zero.

*Machine lock*

Mechanism is provided to lock the machine against operation when the cash drawer is open, or the locking mechanism may be rendered ineffective at the will of the operator. This locking mechanism is illustrated in Figs. 37 and 38 of the drawings.

This machine lock includes a pair of bell crank latches 613 and 614 (Fig. 37) pivoted on the cross rod 61 and urged toward their effective locking positions in the path of the coupling bar 56 on the key coupler 55 by springs 615 and 616, the latch 613 being under the control of the cash drawer 36 and both latches being controlled by a lock-setting lever 617 pivoted on a stud 618 projecting from the intermediate frame 89. The setting lever may be adjusted to any one of three positions, to variously control the locking bell cranks 613 and 614 and when set, is locked in position by a detent 619 under the control of the lid or door 509. The detent 619 is pivotally supported on the intermediate frame 89 and is provided with a serrated opening 622 through which projects a knurled adjusting stud 621 on one arm 622 of the setting lever 617. The stud 621 projects beyond the detent 619 to serve as a handle by which the setting lever 617 may be rocked manually to the desired position. The other arm 623 of the setting lever 617 carries a stud 624 projecting across the planes of the bell crank latches 613 and 614, and against which the springs 615 and 616 press the arms 630 and 631 (Fig. 37) of their respective latches 613 and 614.

The setting lever 617 has three positions, including that in which it appears in Fig. 37 of the drawings. In the position in which it is shown, the setting lever exercises no control over the latch 613. A shoulder 632 on the downwardly extending arm 633 is normally held out of the path of the coupling bar 56 by a bracket 634 secured to the rear of the cash drawer 36. In this position (Fig. 37) however, the stud 624 of the setting lever 617 holds the foot of a leg 635 of the latch 614 out of the path of the coupling bar 56. Thus, it can be seen, that, when the setting lever 617 occupies the position in which it is illustrated and the cash drawer 36 is closed, the machine is free to be operated. But as soon as the cash drawer is released, as an incident to the operation of the machine, the bracket 634 moves away from the end of the arm 633, permitting the spring 615 to rock the latch 613 counter-clockwise until an arcuate forward edge of the arm 633 strikes the raised coupling bar 56 which prevents further clockwise movement of the latch 613 until the key coupler 55 on its downward stroke arrives in its home position, whereupon the spring 615 rocks the latch further counter-clockwise to position the shoulder 632 above the coupling bar 56 thus locking the key coupler 55 and consequently all of the keys 44, 45, 46 and 47 against operation until the drawer 36 is closed. As the drawer 36 approaches its closed position the bracket 634 picks up the arm 633 and restores the latch 613 to its ineffective position.

In case the cash drawer should be released by operation of the usually provided manually operable release device (not shown) the spring 615 immediately rocks the latch counter-clockwise to at once position the shoulder 632 above and in the path of coupling bar 56, to lock up the machine until the drawer is closed.

In order to shift the setting lever 617 it is first necessary to unlock and raise the lid 509 after which the operator may grasp the knurled stud 621 and rock the lever counter-clockwise to either its second or third position from the position in which it is illustrated in Fig. 37. The lid 509 is then closed, locking the appropriate one of the V-shaped notches in the opening 620 over the stud 621, thus securely holding the setting lever in its selected position. In the second or middle position of the setting lever, the stud 624 on the arm 623 thereof blocks counter-clockwise movement of both of the latches 613 and 614. Therefore, when the setting lever 617 occupies its middle position, the machine may be operated at any time regardless of whether the cash drawer is opened or closed.

By rocking the setting lever to its extreme counter-clockwise position, the stud 624 on the arm 623 is positioned above the cut-away end of the arm 631 of the latch 614 whose spring 616 immediately rocks this latch counter-clockwise to position the foot of the leg 635 above and in the path of the coupling bar 56, thus locking the machine against operation until the operator shifts the setting lever 617 to one of its other positions.

A spring-pressed aligning and locating detent 636 (Fig. 38), pivotally supported on the intermediate frame 89, and having three notches in its arcuate upper edge, cooperates with the rounded lower end of the arm 623 to resiliently hold the setting lever 617 in position and to assist the operator in properly setting the lever 617.

Referring to Figs. 1 and 2, it will be observed that the present machine is illustrated as having a printing mechanism for receipts on the right hand side of the machine under a suitable lid, a printing mechanism for totaling operations, in the center of the machine under the lid 509, and an empty space on the left side of the machine under the lid 530. The present machine was constructed in this manner so that it could be provided with a detail strip mechanism such as disclosed in applicant's prior United States Patent No. 1,791,908. The detail strip controls and operating mechanism shown in said patent are practically identical with those disclosed in the present case, making it possible to use the same detail strip mechanism in both machines. It is therefore believed to be unnecessary to include the said mechanism as a part of the present application.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described; the combination with a group of type elements; and a printing hammer therefor; of a pivoted frame to pivotally support the hammer, the frame being adapted to be swung to expose other mechanism; a floating lever on the frame to operate the hammer; and a projection on the frame to restrain the hammer in its normal position relative to the frame when said frame is swung.

2. In a machine of the class described; the combination with type elements; and a printing hammer to take impressions therefrom on a record material; of a pivoted frame to support the hammer; a floating lever on the frame to operate the hammer; means to feed the record material; and tension means slidably carried in the frame to cooperate with the feeding means.

3. In a machine of the class described; the combination with type elements; and an impression means; of a pivoted frame to pivotally support the impression means; a floating drive means for the impression means, the drive means being carried by the pivoted frame; and means to retract the drive means and to automatically effect its escape when sufficiently retracted.

4. In a machine of the class described; the combination with a type element; and an impression means; of a pivoted frame to pivotally support the impression means; floating means to drive the impression means, the drive means being supported on the pivoted frame; means to retract the driving means; a releasable coupling between the driving means and the retracting means; and means to operate the impression means toward the type element.

5. In a machine of the class described; the combination with a type element; and an impression means; of a pivoted frame to pivotally support the impression means; floating means to drive the impression means, the floating drive means being supported on the pivoted frame; means to retract the impression means and the floating drive means, the paths of the driver and of the retracting means being arranged to intersect to enable the driver to escape the retracting means at a certain point; and means to operate the driving means to actuate the impression means.

6. In a machine of the class described; the combination with type carriers; a printing hammer; and a record material frame, said frame being removably supported in the machine; of a latch to releasably hold the hammer in its operative position and to releasably retain the frame in the machine; a spring to partially retract the hammer when the latch is released, the hammer being adapted to be moved manually from its partially retracted position to its fully retracted position, and the latch being effective to hold the hammer in its fully retracted position; and means on the hammer to render the latch ineffective in latching the frame.

7. In a machine of the class described; the combination with type carriers; a printing hammer; and a removably supported record material frame; of a latch to retain the frame in its proper position; a link connected to the latch; and a projection on the link to restrain the hammer from movement away from its operative position.

8. In a machine of the class described; the combination with type carriers; a printing hammer; and a removably supported record material frame; of a latch to retain the frame in its proper position; a link pivoted to the latch; and a projection on the link to restrain the hammer in its operative position.

9. In a machine of the class described; the combination with type carriers; a printing hammer; and a record material frame; of a projection on the frame; a hooked latch cooperating with the projection to releasably hold the frame in its proper position; a link pivotally connected to the latch and operated thereby; a projection on the link cooperating with the hammer to hold the hammer from movement away from its operative position; a spring becoming effective to move the hammer away from the type carriers when the latch is operated; and means on the hammer to prevent the hooked latch from becoming effective while the hammer is retracted.

10. In a machine of the class described; the combination with type carriers; a printing hammer; and a removably supported record material frame; of a hooked latch to releasably hold the frame in proper position; a link operated by the latch; a projection on the link to hold the hammer from movement away from its operative position; a spring to normally urge the hammer away from the type carriers; and means on the hammer to prevent the hooked latch from becoming effective when the hammer is retracted, the projection on the link becoming effective when the hammer is fully retracted to restrain the hammer in its retracted position.

11. In a machine of the class described, the combination of a pivoted printing means; operating means therefor; a connection between the operating means and the printing means mounted on the pivot for the printing means and movable relatively to the printing means, and means associated with the printing means for imparting said relative movement to the connection.

12. In a machine of the class described, the combination of a pivoted printing means; operating means therefor; a connection slotted to pivot and slide on the pivot for the printing means; and a projection on the printing means extending into a slot in one end of the connection.

13. In a machine of the class described, the combination of a pivoted printing means; operating means therefor; a connection slotted to pivot and slide on the pivot for the printing means; a projection on the printing means extending into a slot in one end of the connection; and a projection on the connection in the path of the operating means whereby the connection is actuated.

14. In a machine of the class described; the combination of a pivoted printing means; a connector, slidably and pivotally mounted coaxially with the printing means, operating means and a by-pass pawl on the operating means adapted to actuate the connector when moving in one direction, and to pass by the connector idly when moving in the other direction.

15. In a machine of the class described, the combination of printing means; a spring to actuate the printing means; a connector situated between the printing means and the spring and actuated in one direction by the spring, arresting means for the connector, and a pin and slot connection between the connector and the printing means formed and arranged to allow pivotal movement of the connector about the arresting means as a pivot after the movement of the connector in said one direction is arrested by the arresting means.

16. In a machine of the class described, the combination of a pivoted printing means; a connector for the printing means pivoted coaxially with the printing means, the connector having a slot surrounding the pivot for movement of the connector relatively to the printing means; a spring to actuate the connector and through the connector actuate the printing means; arresting means for the connector; and means to retract and release the connector and printing means, to cause the connector to rotate rapidly until arrested by the arresting means, whereupon the arresting means becomes the pivot for the connector and the printing means advances relatively to the connector to print, the spring adapted to restore the printing means relatively to the connector after the print has been taken.

17. In a machine of the class described, the combination of paper feed rollers, tension rollers, means to tension the rollers, and means on the tension means to guide the paper.

18. In a machine of the class described, the combination of paper feed rollers, tension rollers, means to tension the rollers, including spring pilots, and guides formed on the pilots to guide the paper.

19. In a machine of the class described, the combination of paper feed rollers, tension rollers, means to tension the rollers, including spring pilots, and enlarged ends on the spring pilots to guide the paper.

20. In a machine of the class described, the combination of paper feed rollers, tension rollers on a common axle, springs to tension the tension roller, spring pilots cooperating with the springs and extending over the tension roller axle, and extensions on the pilots forming guides for the paper.

21. In a machine of the class described, the combination of web-severing means, an actuating element for the severing means, a spring to maintain the severing means normally closed, means to retract the actuating element and the severing means, a latch to hold the actuating element retracted, means to withdraw the latch to release the actuating element, and a shoulder on the latch to arrest the actuating element in a position disconnected from the severing means.

22. In a machine of the class described, the combination of web-severing means, an actuating element for the severing means, a spring to maintain the severing means normally closed, means to retract the actuating element and severing means, a latch to hold the actuating element normally in a position disconnected from the severing means, and to hold the actuating element retracted during a part of the operation of the machine, and means to shift the latch to release the actuating element.

23. In a key operated cash register; the combination with a group of press down amount keys, a group of type elements, and a printing hammer to take impressions therefrom on a record material; of a pivoted frame to pivotally support the hammer, the frame being adapted to be swung; means on the frame to operate the hammer upon depression of a key; and means to feed the record material, the last means including tension rollers carried by the frame.

24. In a key operated cash register; the combination with press down amount keys, type elements, and a printing hammer to take impressions therefrom on a record material; of a pivoted frame to pivotally support the hammer; feed rollers to feed the record material upon the return stroke of the depressed key; and tension rollers slidably mounted in the frame to cooperate with the feed rollers.

25. In a key operated cash register; the combination with press down amount keys and type elements; of a pivoted frame; a printing hammer pivotally supported in the frame to take impressions on a record material upon depression of an amount key; means to feed the record material upon the return stroke of the depressed key; and tension means for the feeding means, said tension means being resiliently supported on the pivoted frame.

26. In a machine of the class described; the combination with type carriers; and an impression means movable toward and from the type carriers; of a latch to restrain the impression means from movement away from the type carriers; a normally tensioned spring adapted to move the hammer away from the type carriers when the latch is tripped; and means to cause the latch to restrain the impression means in its fully retracted position.

27. In a machine of the class described; the combination with type carriers; and an impression means; of a latch to releasably hold the impression means in its normal position; means cooperating with the latch to also releasably hold the impression means in its fully retracted position; and a spring cooperating with the impression means to move the latter a distance out of both its normal and retracted positions.

28. In a key operated cash register having press down amount keys, the combination of a stationary frame; a movable frame thereon; printing means on the movable frame; operating means mounted on the stationary frame; and a connection between the printing means and the operating means to actuate the printing means, the connection being at all times connected to the printing means and movable relatively to both the printing means and the operating means and operated upon depression of an amount key.

29. In a key operated cash register having press down amount keys; the combination of a normally closed web-severing means; driving means for the severing means adapted to open the latter upon the depression of an amount key; an intermediate part adapted to be latched to hold the severing means in open position and a pin and slot connection between the severing means and the intermediate part to accommodate manual opening of the normally closed severing means for threading new webs into the machine without moving the intermediate part.

30. In a machine of the class described, the combination with printing type and a type hammer, of a removably supported record material frame, a latch to retain the frame in its proper position, and means operating in coordination with the latch to restrain movement of the hammer in one direction.

31. In a machine of the class described, the combination of a pivoted printing hammer; operating means therefor; and a connection between the operating means and the hammer, adapted for movement about the pivot of the hammer and being loosely connected thereto in such a manner that during the last part of the impression stroke, the connection moves relatively to the hammer.

BERNIS M. SHIPLEY.

CERTIFICATE OF CORRECTION.

Patent No. 2,031,860. February 25, 1936.

BERNIS M. SHIPLEY.

It is hereby certified that error appears in the above numbered patent requiring correction as follows: In the grant, line 13, for "The National Case Register Company" read The National Cash Register Company; page 4, second column, line 25, for "limiting" read limited; page 8, second column, line 55, for "Fig. 5" read Fig. 15; page 9, first column, line 73, for the numeral "32" read 322; page 15, first column, line 9, after "upon" insert which; and line 18, for "counted" read counter; page 17, second column, line 13, after "means" second occurrence, insert a comma; and line 65, claim 20, for "roller" read rollers; and that the said Letters Patent should be read with these corrections therein that the same may conform to the record of the case in the Patent Office.

Signed and sealed this 14th day of April, A. D. 1936.

Leslie Frazer (Seal) Acting Commissioner of Patents.